US006965710B2

(12) United States Patent
Makio

(10) Patent No.: US 6,965,710 B2
(45) Date of Patent: Nov. 15, 2005

(54) OPTICAL SWITCH AND ITS PRODUCTION METHOD, AND OPTICAL PATH-SWITCHING APPARATUS COMPRISING OPTICAL SWITCH

(75) Inventor: Satoshi Makio, Saitama-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 337 days.

(21) Appl. No.: 10/245,297

(22) Filed: Sep. 18, 2002

(65) Prior Publication Data

US 2003/0053744 A1 Mar. 20, 2003

(30) Foreign Application Priority Data

Sep. 18, 2001 (JP) ......................................... 2001-283356
Dec. 21, 2001 (JP) ......................................... 2001-389964

(51) Int. Cl.⁷ ............................. G02B 6/35; G02B 6/36
(52) U.S. Cl. ............................. 385/18; 385/22; 385/24; 385/39; 385/50; 385/47
(58) Field of Search ................................ 385/17–22, 33, 385/16, 24, 15, 39, 47, 50

(56) References Cited

U.S. PATENT DOCUMENTS

| 5,000,534 | A | | 3/1991 | Watanabe et al. |
| 6,337,760 | B1 | | 1/2002 | Huibers et al. |
| 6,424,759 | B1 | * | 7/2002 | Jing ............................. 385/17 |
| 2003/0048983 | A1 | * | 3/2003 | Abel ............................ 385/22 |

FOREIGN PATENT DOCUMENTS

| EP | 1 083 453 | | 3/2001 | |
| JP | 54-020747 | | 2/1979 | |
| JP | 54-162551 | | 12/1979 | |
| JP | 55-025023 | | 2/1980 | |
| JP | 55-087107 | | 7/1980 | |
| JP | 55-159301 | | 11/1980 | |
| JP | 63-313111 | | 12/1988 | |
| JP | 01-269906 | * | 10/1989 | ............ G02B/6/42 |
| JP | 01-306811 | | 12/1989 | |
| JP | 10-319329 | | 12/1998 | |

OTHER PUBLICATIONS

Notice of Reasons for Rejection mailed by the Japanese Patent Office in counterpart foreign Application No. 2002–063443 on May 20, 2005, its English Translation, and a statement of accuracy by the translator.

* cited by examiner

Primary Examiner—Frank G. Font
Assistant Examiner—Michael P. Mooney
(74) Attorney, Agent, or Firm—Finnegan, Henderson, Farabow, Garrett, & Dunner, LLP

(57) ABSTRACT

An optical switch comprising one input optical fiber, two output optical fibers, a stationary mirror for reflecting a light beam from the input optical fiber to cause it to enter into one output optical fiber, a movable mirror moving into and out of an optical path of a light beam from the input optical fiber, and a means for driving the movable mirror; whereby when the driving means drives the second mirror to a position at which it interrupts the optical path, a light beam from the input optical fiber is reflected by the movable mirror so that it enters into the other output optical fiber.

19 Claims, 19 Drawing Sheets

OPTICAL SWITCH AND ITS PRODUCTION METHOD, AND OPTICAL PATH-SWITCHING APPARATUS COMPRISING OPTICAL SWITCH

FIELD OF THE INVENTION

The present invention relates to an optical switch inserted into optical fiber transmission paths used in optical communications, etc. for switching transmission paths, and its production method, and an optical path-switching apparatus comprising such an optical switch.

BACKGROUND OF THE INVENTION

An optical fiber used for a transmission path of light in an optical communications system comprises a core for transmitting light, and a clad layer formed around the core and having a smaller refractive index than that of the core. As optical switches for switching optical paths of a plurality of such optical fibers, many types of optical switches have conventionally been proposed. As a mechanical switch, JP 63-313111 A proposes, as shown in FIG. 28, an optical-fiber-movable, 1×2-type optical switch having a structure in which a magnetic layer 5 attached to an input optical fiber 1A is directly driven by a magnetic coil 4 to switch an optical path 3 of an input optical fiber 1A from an output optical fiber 1B to an output optical fiber 1C. The optical fibers 1A, 1B, 1C are fixed to holders 6A and 6B of a pipe 16, and the magnetic layer 5 of the input optical fiber 1A is held at a predetermined position in the pipe 16 by a magnetic power of a permanent magnet 7 mounted onto an outer surface of the magnetic coil 4.

JP 54-162551 A and JP 55-87107 A disclose, as shown in FIGS. 29 and 30, a micro-optical-element-movable, 1×2-type optical switch for switching optical paths by moving a micro-optical element such as a mirror, prism, etc.

In the optical switch shown in FIG. 29, optical fibers 1A, 1B, 1C are disposed on a circle at an interval of 120° with a reflection surface of a reflection mirror 2 as a center. The input optical fiber 1A is provided with an optical system (not shown) for turning a light beam to a parallel beam. A parallel light beam from the input optical fiber 1A impinges on a reflection mirror 2 along an optical path 3, reflected thereby and enters into an output optical fiber 1B as an output light along an optical path 3a. When the reflection mirror 2 rotates by 120° C., a parallel light beam reflected by the reflection mirror 2 enters into the output optical fiber 1C as an output light along an optical path 3b. Thus, by controlling the rotation angle of the reflection mirror 2, the output optical fibers 1B, 1C can be selected.

In the conventional micro-optical-element-movable switch shown in FIG. 29, however, when there is a large rotation angle of the reflection mirror 2, the optical switch needs a large area because the optical fibers are radially arranged.

In the optical switch shown in FIG. 30, output optical fibers 1B, 1C, 1D, 1E, 1F, 1G are arranged on a circle with an input optical fiber 1A as a center. A parallel light beam from the input optical fiber 1A is reflected by two 45°-reflection mirrors 2 along an optical path 3, and enters into an output optical fiber 1B along an optical path 4. By controlling the rotation angle θ of the reflection mirror 2, each output optical fiber can be selected.

The rotation angle and position of a prism or a mirror is controlled by a pulse motor, etc. in a conventional micro-optical-element-movable switch. However, because positioning precision on the sub-micron order is needed in the coupling of optical fibers used in optical communications, position control by a pulse motor, etc., whose rotation angle precision is as low as about 0.5°, provides only poor reproducibility in the switching of optical paths, resulting in increase in loss. Also, it is disadvantageous in that current should always be supplied to a motor.

In the conventional optical switch shown in FIGS. 2(a) and (b), the rotation angle θ of a reflection mirror 2 is used to distribute a light beam from 1A to 1B and 1C. A light beam from 1A to 1B impinges on and is reflected by a reflection mirror 2 at an angle $\phi_1$ relative to a normal $D_1$ of the reflection mirror 2, while a light beam from 1A to 1C impinges on and is reflected by a reflection mirror 2 at an angle $\phi_2$ relative to a normal $D_2$ of the reflection mirror 2. $\phi_1$ and $\phi_2$ are half of the rotation angle θ of the reflection mirror 2, $\phi_1=\phi_2=\theta/2$.

An actual input optical fiber is provided with a lens for turning a light beam to a parallel light beam, and light reflected by the reflection mirror 2 should enter into a lens of an output fiber at center. Accordingly, the optical fibers should be separated from each other by a distance D equal to or higher than the radius of the lens. Thus, the distance $L_B$, $L_C$ from the reflection mirror 2 to each output optical fiber 1B, 1C is $L_B=L_C=D/\tan \phi_1$. If the rotation angle θ is too small, the distance $L_A$, $L_B$, $L_C$ between the reflection mirror 2 and the optical fibers 1A, 1B, 1C should be long enough to prevent their mutual interference, resulting in a larger optical switch. Also, in the case of a conventional optical switch as shown in FIG. 2(a), in which optical paths are switched only by the rotation of a reflection mirror 2, a reflection mirror 2 is always moving, necessitating the control of the rotation angle θ with high precision.

FIG. 4 shows the calculation results of the distance L between the reflection mirror 2 and the optical fibers relative to the distance D between the optical fibers when the rotation angle θ of the reflection mirror 2 is set at 4°, 6°, 8° and 10°, respectively. As is clear from FIG. 4, when the rotation angle θ of the reflection mirror 2 is small, the distance L between the reflection mirror 2 and the optical fiber should be long. Because a collimator lens used has a diameter of about 3.2 mm, the distance D should be 2 mm or more taking into account the diameter of a light beam. Therefore, the distance between the reflection mirror 2 and the optical fiber is about 28 mm at a rotation angle θ of 8°, resulting in a larger optical switch. In this case, because an optical path length is as long as 56 mm from the input optical fiber 1A to the output optical fibers 1B, 1C, there is large loss in coupling to the optical fibers, resulting in difficulty to achieve low loss.

With respect to optical fibers, too, there is a problem of reflection return. The reflection return is a phenomenon that occurs by the difference in a refractive index between the core and air when light transmitting in a core of an optical fiber reaches its end. Because a reflection return light returns to a light-emitting element such as a semiconductor laser, etc., an oscillation state becomes unstable. Accordingly, to suppress the reflection return light, the end of an optical fiber is cut slantingly or rounded, or a reflection-preventing film is formed on the end of the optical fiber to alleviate the difference in a refractive index between the core and air.

It has been common that light exiting from one optical fiber is collimated by a lens and caused to impinge on the other optical fiber. Used as a lens for this purpose are a GRIN lens of a refractive index distribution type, etc. However, the GRIN lens is extremely larger than the optical fiber, resulting in a larger apparatus.

JP 54-20747 A discloses the high-efficient coupling of light to a light-emitting element or a light-receiving element by rounding the ends of optical fibers. As shown in FIG. 31, when a spherical portion 105 is simply formed at a tip end of an optical fiber 100, the radius R of curvature of the spherical portion 105 can be made larger than the radius ($D_1/2$) of the optical fiber, though a spherical surface cannot be enlarged at the end of a core 106. Accordingly, light 103 exits from the end of the optical fiber substantially in the same manner as before the tip end is turned to a spherical portion 105, failing to achieve high coupling to a light element, etc. The term "high coupling" means that an optical fiber and a light element or both optical fibers are coupled at high efficiency while suppressing the leak of light. In addition, there is substantially the same level of a reflection return light as before a spherical portion 105 is provided at a tip end of the optical fiber.

As a method for treating the end of an optical fiber, JP 1-269906 A discloses a method of melting a core 106 and a clad layer 107 uniformly, and forming its tip end to a semicircular shape. FIG. 32 shows an optical fiber core 106 having a spherical tip portion 105 formed by melting a core 106 and a clad layer 107. In this optical fiber, the distance T from the tip end of the spherical tip portion 105 to the core is smaller than the diameter (2R) of the spherical tip portion 105. Accordingly, the expanding angle NA of light 103 emitted from the spherical tip portion 105 is substantially the same as the expanding angle of light in the core. As a result, a light beam 103 exiting from the spherical tip portion 105 so expands that the spherical tip portion 105 cannot act as a collimator.

OBJECTS OF THE INVENTION

Accordingly, an object of the present invention is to provide a small, low-loss optical switch with high precision of positioning and high reproducibility and its production method.

Another object of the present invention is to provide an optical path-switching apparatus comprising such optical switches.

SUMMARY OF THE INVENTION

The first optical switch of the present invention comprises one input optical fiber, two output optical fibers, a reflection mirror for switching an optical path of a light beam from the input optical fiber from one output optical fiber to the other output optical fiber, the distance between the input optical fiber and the reflection mirror being different from that between each of the output optical fibers and the reflection mirror.

A light beam incident on the reflection mirror from the input optical fiber is preferably at an angle of 10° or less to a normal of the reflection mirror.

It is preferable that the rotation angle of the reflection mirror is 20° or less, and an angle of each output optical fiber to the reflection mirror is two times the rotation angle of the reflection mirror.

According to a preferred embodiment of the present invention, the optical switch comprises N sets of inputs and outputs each comprising one input optical fiber and two output optical fibers, and one reflection mirror for carrying out the switching of the N sets of inputs and outputs.

In the above optical switch, the one input optical fiber may be used as an output optical fiber, and the two output optical fibers may be used as input optical fibers, namely an input and an output may be reversed.

The second optical switch of the present invention comprises one input optical fiber, two output optical fibers, a first mirror for reflecting a light beam from the input optical fiber to cause it to enter into one output optical fiber, a second mirror moving into and out of an optical path of a light beam from the input optical fiber, and a means for driving the second mirror; whereby when the driving means drives the second mirror to a position at which it interrupts the optical path, a light beam from the input optical fiber is reflected by the second mirror so that it enters into the other output optical fiber.

In the above optical switch, the optical path of a light beam from one of the two input optical fibers can be changed by a mirror to be connected to one output optical fiber. Namely, the relation of input and output fibers may be reversed.

It is preferable that the first mirror is a stationary mirror, and that the second mirror is a movable mirror. An incident angle $\alpha_1$ of a light beam from the input optical fiber to the first mirror is preferably different from an incident angle $\alpha_2$ of a light beam from the input optical fiber to the second mirror, and the difference between $\alpha_1$ and $\alpha_2$ is preferably 0.5° or more. Any of the incident angles of the light beam to the first and second mirrors is preferably 20° or less.

Though a mirror is always moving largely, with difficulty to control its position and rotation angle with high precision in a conventional mirror-driven, optical switch, the optical switch of the present invention comprising two reflection mirrors has high position precision in changing an optical path by a stationary mirror, and the operation of a movable mirror is so simple that the change of position and angle of an optical path by the movable mirror can be repeated with high precision.

The length of an optical path reflected by a stationary mirror between an input optical fiber and an output optical fiber is preferably the same as the length of an optical path reflected by a movable mirror between an input optical fiber and an output optical fiber.

As described above, by regulating the difference ($\alpha_1-\alpha_2$) of incident angles and the incident angles per se, it is possible to increase the connection precision of optical paths and miniaturize the optical switches.

A plurality of the optical switches may be connected in a multi-stage manner to constitute an N×M optical switch. Multi-stage connection can constitute optical switches having more branches than 1×2. In this case, there is a relation of N<M, wherein N is an integer of 1 or more, and M is an integer of 3 or more. The term "N×M optical switch" herein means an optical switch having N input terminals and M output terminals. Also, the term "multi-stage connection" herein means that at least one output optical fiber of one 1×2-type optical switch is connected to an input optical fiber of the other 1×2-type optical switch to increase the number of branches for switching optical paths.

The optical switch of the present invention may be provided with a structure of an N×2N-type optical switch for switching N optical paths, wherein N is an integer 2 or more. The first type of this N×2N-type optical switch has a structure that N 1×2-type optical switches are arranged in parallel to conduct the switching of each optical path independently. The second type is an N×2N-type optical switch having a structure comprising N sets of input and output optical fibers and a set of stationary mirror and a movable mirror to conduct the switching of N optical paths simultaneously.

Because the N×2N-type optical switch and the multi-stage-connected N×M optical switch are constituted by a combination of the miniaturized optical switches of the present invention, they are smaller in an entire size than those obtained by combining conventional optical switches.

It is preferable that in each optical switch of the present invention, any of the input optical fiber and the output optical fiber comprises an optical fiber body portion comprising a core for transmitting light, and a tip optical fiber portion integrally fused to a tip end of the optical fiber body portion, the tip optical fiber portion having a core having a larger diameter than that of the core of the optical fiber body portion or being composed only of a core, the tip optical fiber portion having a spherical tip portion.

The outer diameter of the tip optical fiber portion is preferably equal to or larger than the outer diameter of the optical fiber body portion. By increasing the outer diameter of the tip optical fiber portion, the radius of curvature of the spherical tip portion can be increased, resulting in a larger output diameter of a light beam, which makes it easy to send an output light beam far. The radius of curvature of the spherical tip portion of the tip optical fiber portion is preferably half or more of the outer diameter of the tip optical fiber portion.

The spherical-tip optical fiber according to the preferred embodiment of the present invention comprises an optical fiber body portion having a core for transmitting light, and a tip optical fiber portion integrally connected to the optical fiber body portion, the tip optical fiber portion having a spherical portion at a tip end, the radius R of curvature of the spherical tip portion and the outer diameter $D_1$ of the optical fiber body portion meeting the relation of $R > D_1/2$. The optical fiber body portion and the tip optical fiber portion are preferably connected to each other via their flat end surfaces.

Incidentally, the "tip optical fiber portion" has a larger core diameter than that of the optical fiber body portion, or is composed only of a core without a clad layer.

With the above spherical-tip optical fiber, a collimator may be formed. Light may exit and enter between the above spherical-tip optical fibers, or light may be transmitted between a light-emitting element or a light-receiving element and the spherical-tip optical fiber. With a collimated light (parallel light beam) exiting from one spherical-tip optical fiber and entering into the other spherical-tip optical fiber, a high-coupling collimator can be constituted. In the above spherical-tip optical fiber, the optical fiber body portion and the tip optical fiber portion may have the same refractive index. Also, by selecting the materials of both optical fibers such that the refractive index of the tip optical fiber portion is higher than that of the optical fiber body portion, it is possible to achieve high-coupling collimating.

The term "collimator" used herein means a member for turning light exiting from a core end of an optical fiber to a substantially parallel light beam, though it may not necessarily be a completely parallel light beam as long as light exiting from a core end of an optical fiber sufficiently impinges on an end surface of the opposing optical fiber or a light-receiving surface of a collimator.

The spherical-tip optical fiber preferably has such low reflection that the level of a reflected light from the spherical tip portion is 55 dB or more. When light enters into and exits from a spherical tip portion of an optical fiber, the reflection return N of light preferably meets the following relation:

$$N = -10 \log_{10}(I_1/I_2) \geq 55 \text{ dB},$$

wherein, $I_1$ is the amount of light reflected in an interface between the spherical tip portion and air, and $I_2$ is the amount of incident light. To measure the amount of each light, two optical fibers on one side of an optical-fiber-type, 2×2 directional coupler are connected to a light source and a sensor, while one optical fiber on the opposite side is connected to an optical fiber A for measuring the amount of reflection, and another optical fiber on the opposite side is connected to a slantingly cut optical fiber B having low reflection loss (>70 dB). With Fresnel reflection loss (14.7 dB) on a vertical cut surface of an optical fiber as a reference reflection loss, the amount of reflection from the optical fiber A is measured by the sensor.

In the optical switch according to a preferred embodiment of the present invention, two or more of the above spherical-tip optical fibers are combined, with mirror for switching optical paths arranged between the spherical-tip optical fibers. Using the spherical-tip optical fiber of the present invention, an optical path length between the optical fibers can be made sufficient in the optical switch. With enough optical path length, the optical switch can be miniaturized by changing the arrangement of optical fibers and bending the optical paths.

The optical path-switching apparatus of the present invention is characterized by having the above optical switches. The optical switch of the present invention can be applied to, for instance, an optical path-switching apparatus having a function such as an optical add drop multiplexer (OADM) or an optical cross connector (OXC), etc. OADM is a device for taking light of a particular wavelength out of the course of a transmission line and diverting it to a local network, and OXC is a device for distributing a signal of each wavelength at a point crossing the other main line.

Another optical path-switching apparatus of the present invention comprises an electronic or electric circuit together with the above optical switches. The electronic or electric circuit may be a control circuit (for instance, driver ICs and OP amplifiers) for controlling the switching of optical paths, a position-detecting circuit for detecting which optical paths an optical fiber is switched to, a circuit for supplying current to a driving means, or a power supply, etc. Driving current is supplied to a driving means mounted onto the optical switch for switching optical paths. By limiting the driving current in one direction, a driving circuit and a control circuit can be simplified as compared with optical switches necessitating the reversal of driving current directions, whereby the entire optical path-switching apparatus can be miniaturized. For instance, when a magnetic coil is used in a driving means, the direction of current should be reversed to switch optical paths. On the other hand, when a relay, etc. is used in the driving means, the ON/OFF of current is only needed for switching.

The method for producing an optical switch according to the present invention comprises the steps of integrally connecting a tip end of an optical fiber body portion comprising a core for transmitting light to a tip optical fiber portion having a core whose diameter is larger than that of the optical fiber body portion, and turning a tip portion of the tip optical fiber portion spherical. The fusing of the optical fiber body portion and the tip optical fiber portion is preferably carried out using an optical-fiber-fusing apparatus, and a fusing method is preferably an electric discharge method.

An optical device can be constituted by mounting the above spherical-tip optical fibers. The optical devices to which the present invention is applicable are, for instance, (a) a light module, for instance, a laser diode module, for sending light from light-emitting elements outside by spherical-tip optical fibers, (b) an inline light filter in which spherical-tip optical fibers are opposing via a filter, (c) an optical connector, (d) an apparatus for transmitting light from a spherical-tip optical fiber to a light-receiving element, (e) a fiber-driven optical switch for switching optical paths by abutting both optical fibers or moving them, (f) a prism-driven-type optical switch for switching optical paths by moving prisms in place of mirrors, (g) a waveguide-path-type optical switch having spherical-tip optical fibers at positions at which wave guide paths are coupled to external optical fibers, (h) a micro-electromechanical system (MEMS) for switching optical paths with micromirrors arranged in a two-dimensional matrixpattern, (i) MEMS for switching optical paths by opposing micromirror arrays three-dimensionally, etc. In addition to these apparatuses, optical communications apparatuses, optical communications lines and optical measurement apparatuses, in which optical paths of optical fibers should be coupled or relayed, can achieve high coupling of light transmission, when the spherical-tip optical fibers of the present invention are used.

DESCRIPTION OF THE PREFERRED EMBODIMENTS

Figure 1A:
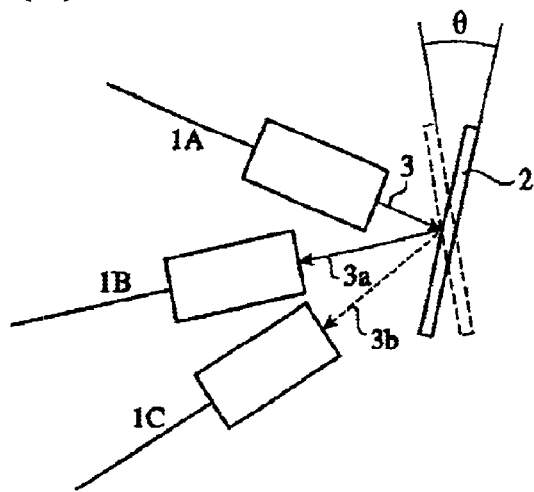
FIG. 1(a) is a plan view showing a 1×2-type optical switch according to one embodiment of the present invention.

The embodiments of the present invention will be explained in detail referring to the attached drawings, without intention of restricting the present invention to these embodiments. In each figure, optical fibers are depicted by simple lines, though this is not showing the outer diameter sizes of optical fibers. The same reference numerals are assigned to the same or similar parts in each figure.

EXAMPLE 1

FIG. 1(a) shows an example of the optical switches of the present invention. In this optical switch, a light beam 3 from an input optical fiber 1A is reflected by a reflection mirror 2 and coupled to an optical fiber 1B along an optical path 3a. When the reflection mirror 2 rotates by an angle θ, a light beam reflected by the reflection mirror 2 is coupled to an optical fiber 1C along an optical path 3b. The distance between the input optical fiber 1A and the reflection mirror 2 differs from those between the output optical fibers 1B, 1C and the reflection mirror 2.

Figure 2A:
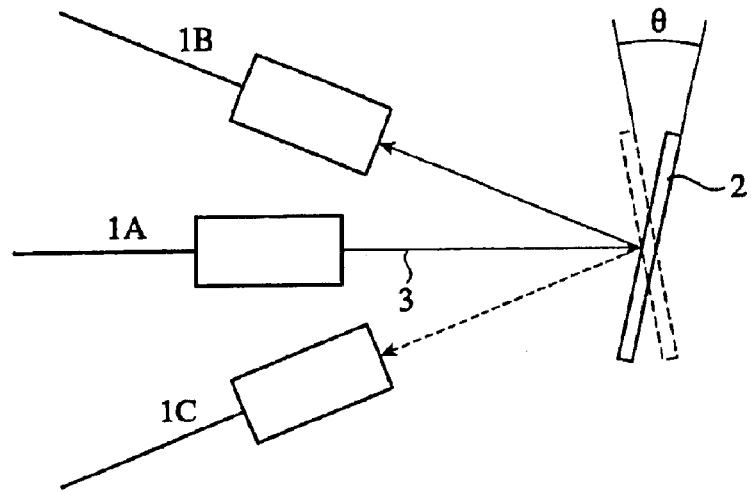
FIG. 2(a) is a plan view explaining a conventional 1×2-type optical switch.

In the conventional optical switch shown in FIGS. 2(a) and (b), a light beam is distributed from an optical fiber 1A to an optical fiber 1B or 1C by a rotation angle θ of a reflection mirror 2. Accordingly, as small a rotation angle θ of the reflection mirror 2 as 8° results in about 28 mm in the distance ($L_B$, $L_C$) between the reflection mirror 2 and the optical fibers, which inevitably leads to a larger optical switch.

Figure 1B:
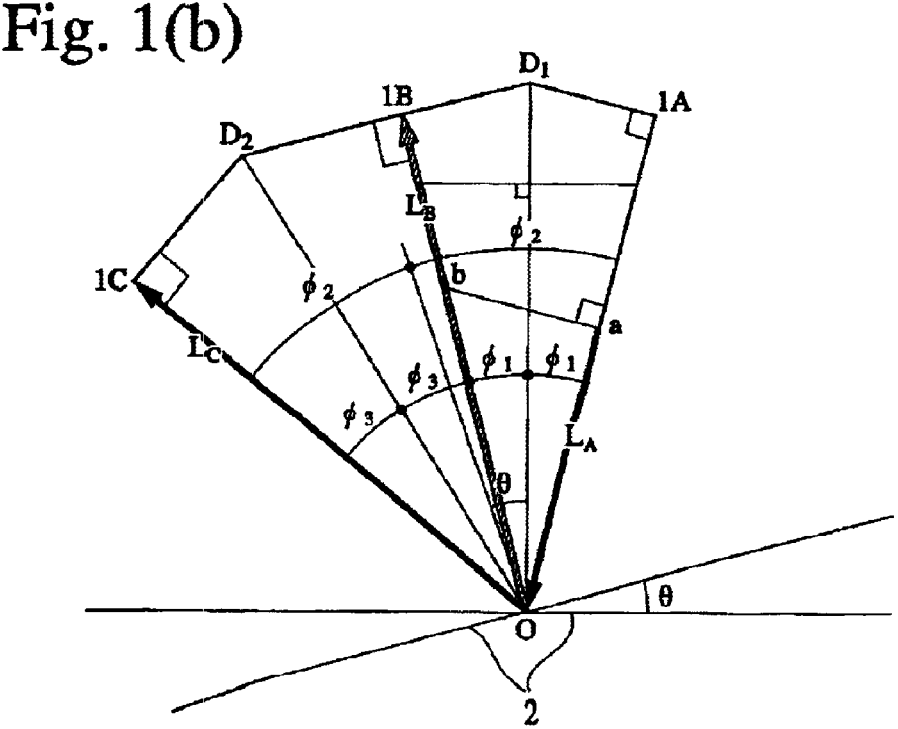
FIG. 1(b) is a view showing the details of the 1×2-type optical switch of FIG. 1(a)

On the other hand, as is clear from FIG. 1(b) showing the position relations between an input optical fiber 1A, output optical fibers 1B, 1C and a reflection mirror 2, the input optical fiber 1A is positioned not at a center but on one side in the present invention, whereby a light beam is incident on the reflection mirror 2 at an angle $\phi_1$, reflected by the reflection mirror 2 at an angle $\phi_1$ relative to a normal $D_1$ of the mirror 2, and enters into the output optical fiber 1B. When the reflection mirror 2 rotates by $\theta$, a light beam is incident on the reflection mirror 2 at an angle $\phi_2$, reflected by the reflection mirror 2 at an angle $\phi_2$ relative to a normal $D_2$ of the mirror 2, and enters into the output optical fiber 1C. The distances $L_B$, $L_C$ between the output optical fibers 1B, 1C and the reflection mirror 2 are $L_B=L_C=D/\tan(\phi_3)$, and $\phi_2=\theta+\phi_1$, $\phi_3=\theta$. When optical paths are switched between the output optical fibers 1B, 1C, the rotation angle of the optical path is two times the rotation angle $\theta$ of the mirror 2. The distance $L_A$ between the input optical fiber 1A and the reflection mirror 2 is $L_A=D/\tan(2\phi_1)$.

Figure 3:
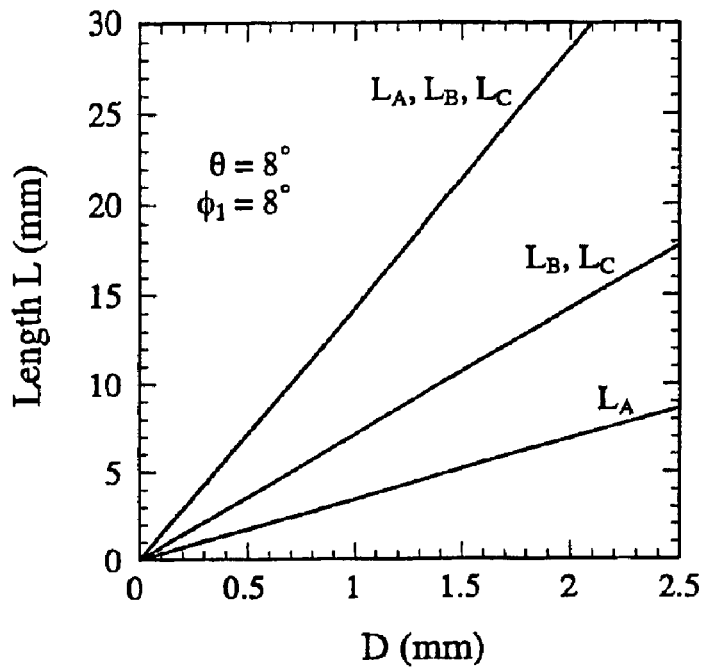
FIG. 3 is a graph showing the relation between the distance L between a reflection mirror and a tip of an optical fiber and distance D between the optical fibers in the optical switch of Example 1.
Figure 4:
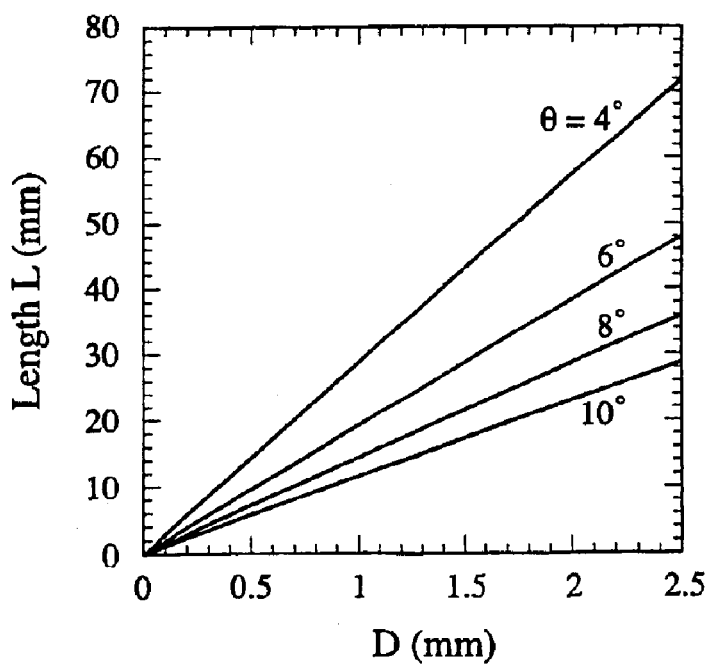
FIG. 4 is a graph showing the relation between the distance L between a reflection mirror and an optical fiber and the distance D between the optical fibers in the conventional optical switch shown in FIG. 2.

FIG. 3 shows calculation results of the distance L between the reflection mirror 2 and a tip end of each optical fiber at each distance D, when the rotation angle $\theta$ of the reflection mirror 2 is 8°, and the incident angle $\phi_1$ of a light beam from the input optical fiber 1A is 8°. For comparison, FIG. 4 shows calculation results as $L_A$, $L_B$, $L_C$ in the case of the conventional optical switch shown in FIGS. 2(a) and (b). At the distance D of 2 mm, $L_A$ is about 7 mm, and $L_B$, $L_C$ are about 14 mm in the optical switch of Example 1, about half of those of the conventional optical switch.

Figure 5:
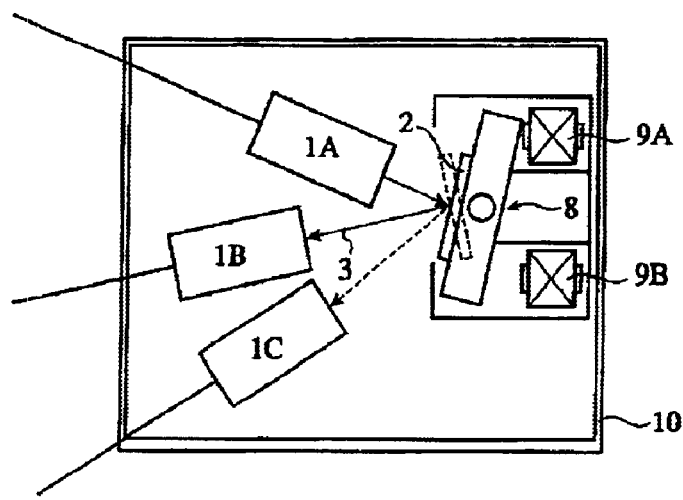
FIG. 5 is a plan view showing a specific example of the structure of the 1×2-type optical switch of the present invention.

FIG. 5 shows a specific example of optical switches according to this Example. A reflection mirror 2 is mounted onto a driving means 8. With opposite current flowing through magnetic coils 9A, 9B, mirrors (or a support of mirrors) are attracted to or repulsed by the magnetic coils 9A, 9B to rotate the driving means 8. In a preferred example, the size of a casing 10 is 19 mm in width, 27 mm in length, and 8.5 mm in thickness.

Figure 6:
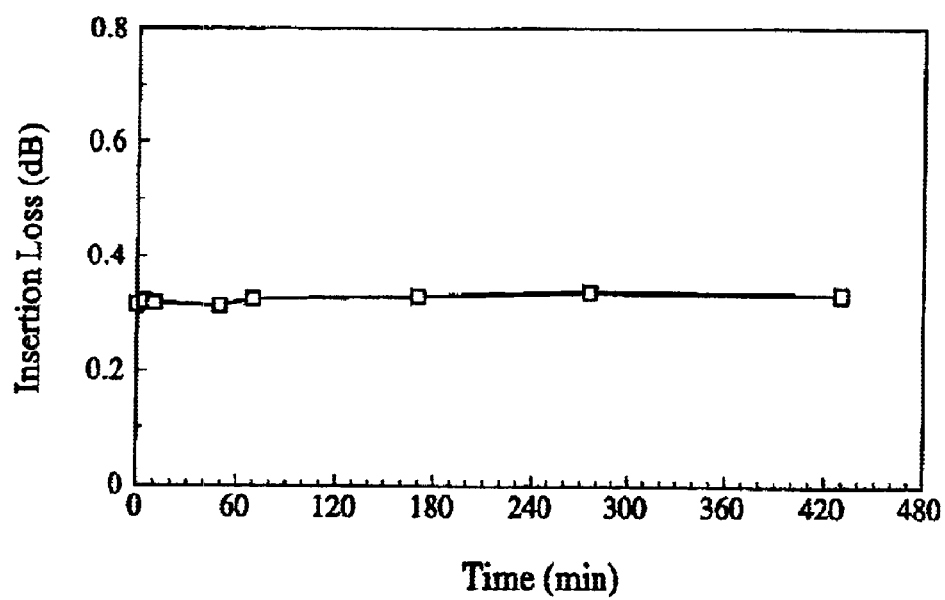
FIG. 6 is a graph showing the insertion loss of the optical switch of Example 1.

FIG. 6 shows the measurement results of insertion loss in the optical switch of Example 1, when each optical fiber and its collimator lens are fixed by an adhesive. The axis of abscissas represents time (min), and the axis of ordinates represents insertion loss (dB). After 30 minutes of curing of the adhesive, there was substantially no deviation of position in optical fibers, etc., thereby achieving the insertion loss of 0.32 dB.

Figure 7:
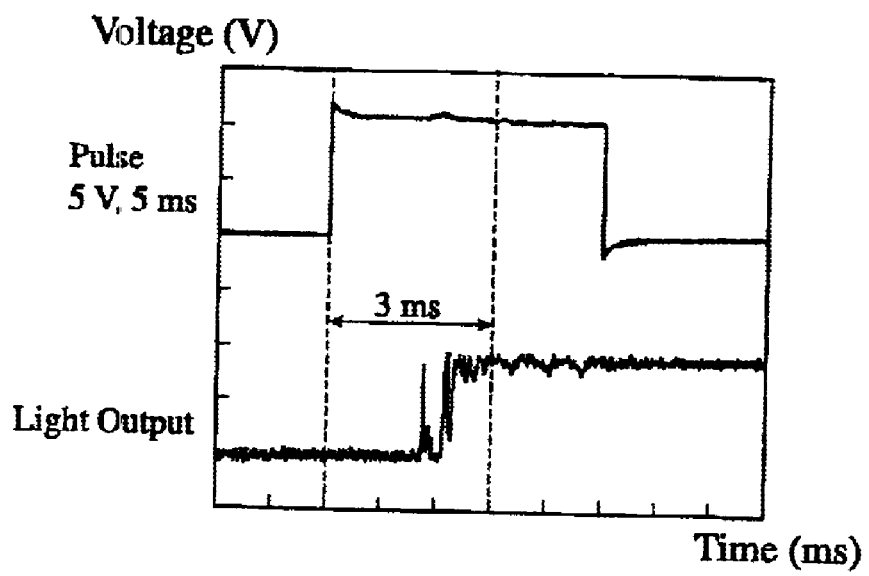
FIG. 7 is a graph showing the switching characteristics of the optical switch of Example 1.
Figure 8:
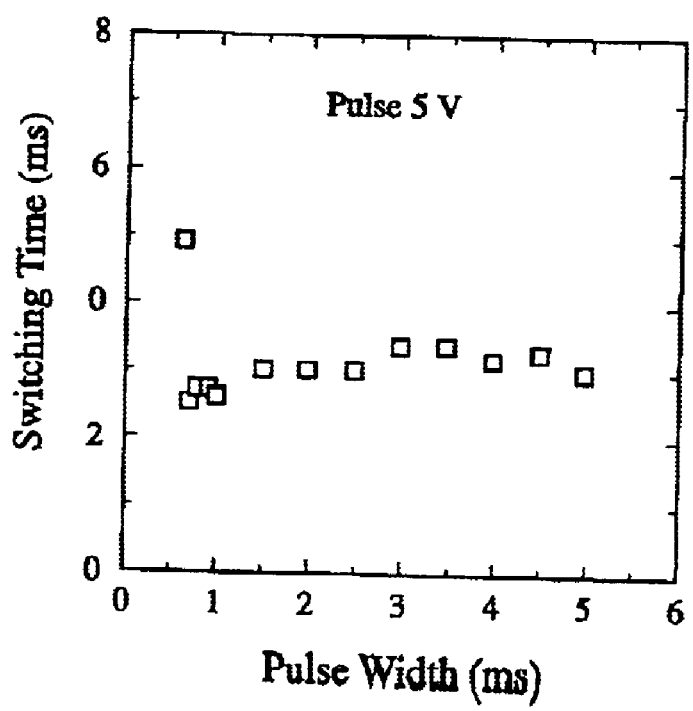
FIG. 8 is a graph showing the relation between pulse width and switching time in the optical switch of Example 1.
Figure 9:
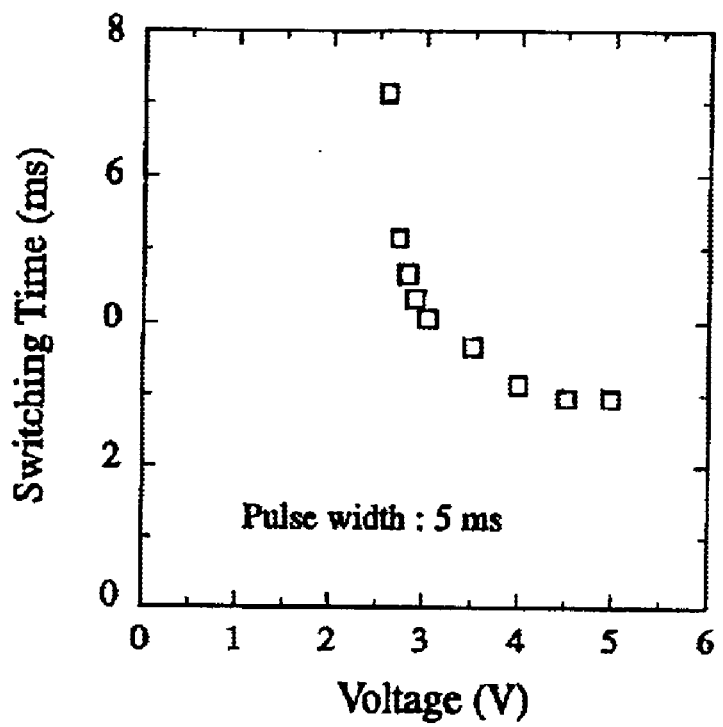
FIG. 9 is a graph showing the relation between driving voltage and switching time in the optical switch of Example 1.

FIG. 7 shows the measurement results of switching characteristics of the optical switch of Example 1. It is clear from FIG. 7 that light output is obtained for a switching time of about 3 ms by using a switching input pulse of 5 V and 5 ms. FIG. 8 shows the measurement results of the switching time of the optical switch relative to a pulse width at an input pulse voltage of 5 V. The axis of abscissas represents pulse width, and the axis of ordinates represents switching time (ms). It is clear from this graph that the switching time of about 3 ms was obtained at 0.7 ms or more. FIG. 9 shows the measurement results of the switching time of the optical switch relative to pulse voltage at an input pulse width of 5 ms. The axis of ordinates represents switching time (ms), and the axis of abscissas represents pulse voltage (V). It is clear from this graph that the minimum driving voltage is 2.5 V or more, and that the switching time of 3 ms can be obtained at 4 V or more.

The optical switch of Example 1 has as low insertion loss as 1 dB or less and is as fast as 3 ms in switching time. Even after 100,000 repetitions of switching, its insertion loss was 0.1 dB or less, confirming that this optical switch had extremely high reproducibility. The rotation angle and the incident angle of the input optical fiber are 8° in this Example. When the rotation angle exceeds 20°, the switching time becomes longer, resulting in larger dependency of insertion loss on polarized light. Accordingly, the rotation angle is preferably 20° or less.

Though an electromagnetic actuator was used to rotate the reflection mirror 2 in this Example, a stepping motor, etc. may be used.

EXAMPLE 2

Figure 10:
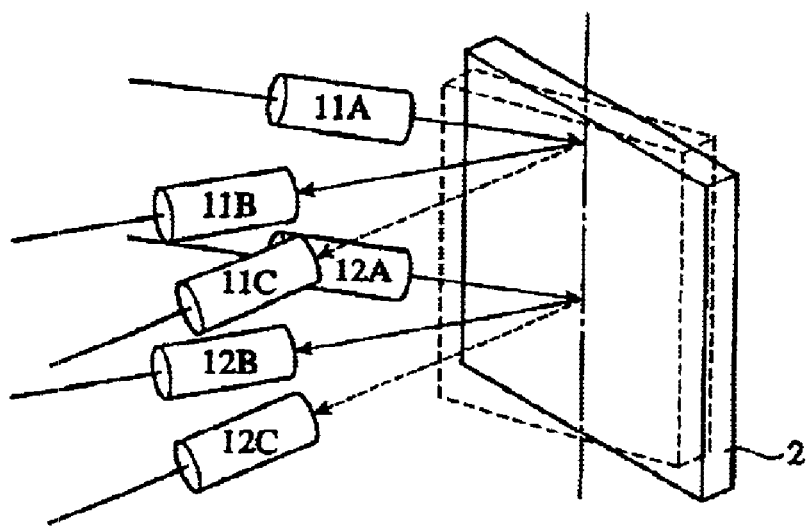
FIG. 10 is a perspective view showing the 1×2-type optical switch of Example 2.

FIG. 10 shows another example of the optical switches of the present invention. In this optical switch, a 1×2-type optical switch comprising a combination of one input optical fiber 1A and two output optical fibers 1B, 1C, and a 1×2-type optical switch comprising a combination of one input optical fiber 2A and two output optical fibers 2B, 2C are vertically arranged, and one reflection mirror 2 is used for these 1×2-type optical switches. Though the two 1×2 switches are switched simultaneously in this Example, as large a 1×2-type optical switch as N times can be realized by arranging N 1×2-type optical switches. In addition, instead of simultaneously switching in the same direction, different combinations of switching can be realized by separately controlling 1×2-type optical switches.

EXAMPLE 3

Figure 11:
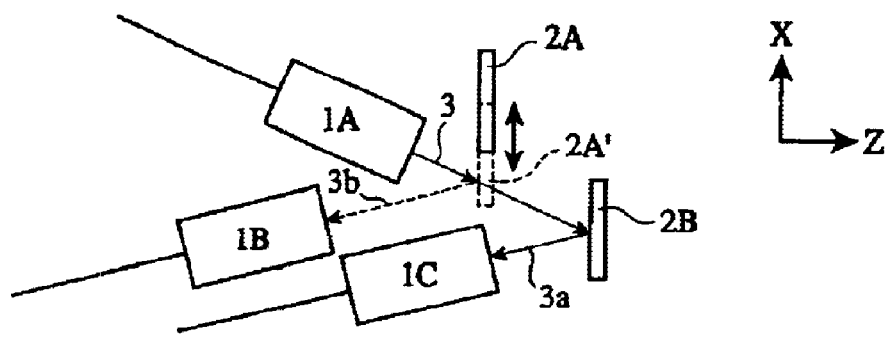
FIG. 11 is a plan view showing the 1×2-type optical switch of Example 3.

FIG. 11 schematically shows another example of the 1×2-type optical switches of the present invention. In this optical switch, a light beam 3 coming from an input optical fiber 1A is reflected by a stationary reflection mirror 2B, and enters into an output optical fiber 1C along an optical path 3a. When a movable reflection mirror 2A moves in an X direction to interrupt the optical path 3, a light beam from the input optical fiber 1A is reflected by the movable reflection mirror 2A, and coupled to an output optical fiber 1B along an optical path 3b.

In this optical switch, the distance between the input optical fiber 1A and the output optical fiber 1B is equal to the distance between the input optical fiber 1A and the output optical fiber 1C. That is, the optical path length between 1A and 1B is equal to that between 1A and 1C. Each optical fiber is equipped with a collimator at a tip end. The scattering of light at an end of the input optical fiber 1A is suppressed by the collimator, whereby light from the input optical fiber 1A is efficiently introduced into the output optical fibers 1B, 1C.

Figure 12:
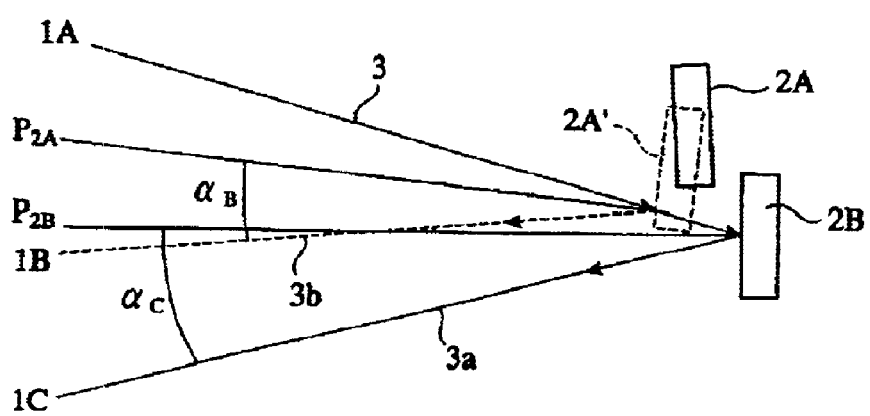
FIG. 12 is an enlarged view showing in detail the relation between reflection mirrors and optical paths in the 1×2-type optical switch of FIG. 11.

FIG. 12 is an enlarged view showing in detail the relation between reflection mirrors 2A, 2B and optical paths in FIG. 11. A light beam from an input optical fiber 1A along an optical path 3 is reflected by a stationary reflection mirror 2B, and coupled to an output optical fiber 1C along an optical path 3a. In this case, the incident angle of the light beam=reflection angle=$\alpha_C$.

Figure 2B:
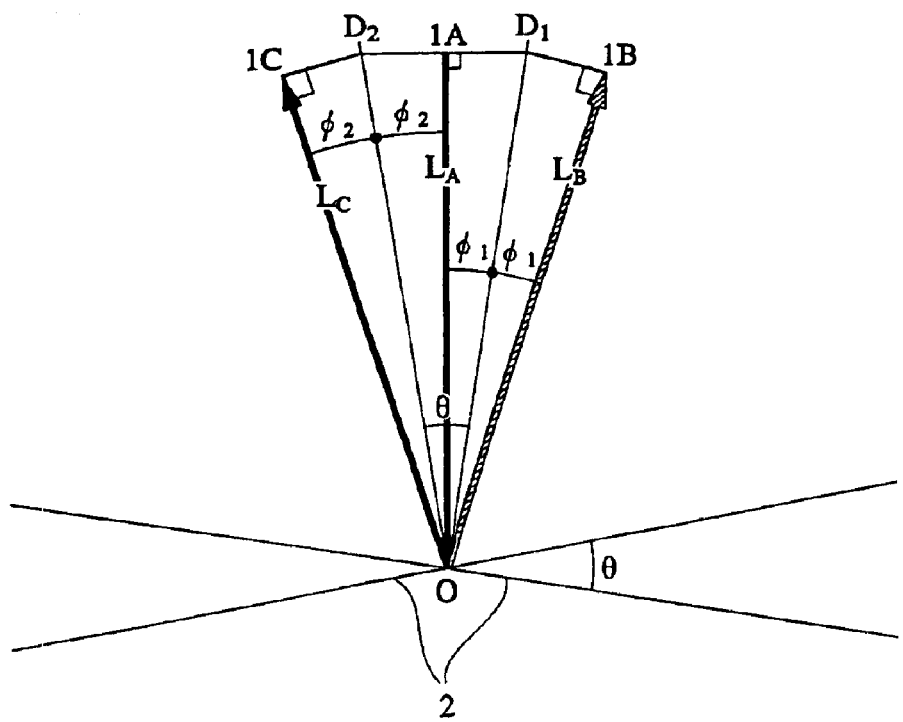
FIG. 2(b) is a view showing the details of the 1×2-type optical switch of FIG. 2(a)

The movable reflection mirror 2A is disposed movably to the optical path 3, and a light beam from the input optical fiber 1A is reflected by the movable reflection mirror 2A, whereby the optical path 3 is coupled to the output optical fiber 1B. In this Example, the incident angle of the light beam=reflection angle=$\alpha_B<\alpha_C$. In FIG. 2, each of the lines $P_{2A}$ and $P_{2B}$ indicates a normal of each reflection mirror 2A, 2B on a mirror surface.

Figure 13:
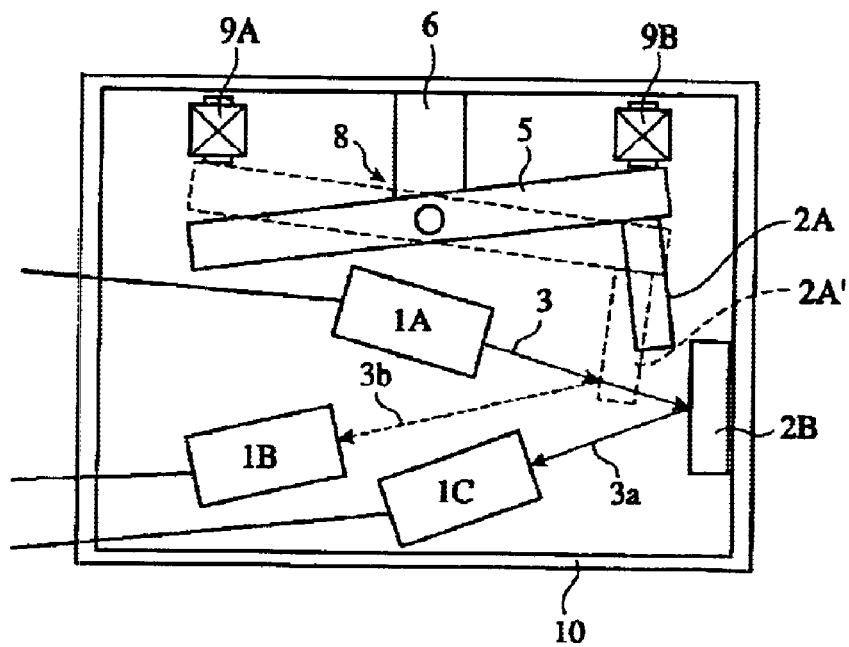
FIG. 13 is a view showing the specific structure of the optical switch in Example 3.

FIG. 13 shows the specific structure of the optical switch of Example 3. The movable reflection mirror 2A is disposed on the driving means 8. The driving means 8 comprises a seesaw-type, soft magnetic bar 5 rotatably supported by a center support 6, and the movable reflection mirror 2A is mounted onto one end of the bar 5. With opposite current supplied to magnetic coils 9A, 9B, the seesaw-type bar 5 is attracted to or repulsed by the magnetic coils 9A, 9B, so that it rotates around the support 6. As a result, the movable reflection mirror 2A fixed to one end of the bar 5 moves into and out of the optical path 3.

The other end of the support 6 is fixed to a casing 10. A state in which the bar 5 is attracted to the magnetic coil 9B (the movable reflection mirror 2A does not interrupt the optical path 3) is shown by a solid line, and a state in which the bar 5 is attracted to the magnetic coil 9A (the movable reflection mirror 2A interrupts the optical path 3) is shown by a dotted line. With respect to conductors for supplying current to the magnetic coils 9A, 9B from outside, and terminals mounted onto the casing for connection to the conductors, their depiction is omitted in the figure. In a preferred embodiment, the size of the casing 10 covering a mechanism for switching optical paths is 14 mm in width, 16 mm in length, and 8.5 mm in thickness.

In a preferred embodiment, the incident angle of a light beam $\alpha_B$ from the input optical fiber 1A, to the movable mirror 2A is set at 8°. When the incident angle of a light beam $\alpha_B$ is more than 20°, the switching time becomes longer, resulting in larger dependency of insertion loss on polarized light. Therefore, the incident angle of a light beam $\alpha_B$ is preferably 20° or less.

With difference in the incident angles $\alpha_B$, $\alpha_C$ of a light beam to the movable reflection mirror 2A and the stationary reflection mirror 2B, there is no overlap between the output optical fiber 1B and the output optical fiber 1C, resulting in miniaturized optical path arrangement and ease to adjust them. In this Example, the angle difference ($\alpha_B-\alpha_C$) of a light beam is set at 5°, and the incident angle $\alpha_C$ is set at 130, though they may change depending on the distances between the reflection mirrors and the optical fibers. The insertion loss of this optical switch is 0.65 dB or less. Thus, a small optical switch with low loss and high-precision positioning can be provided.

Figure 14:
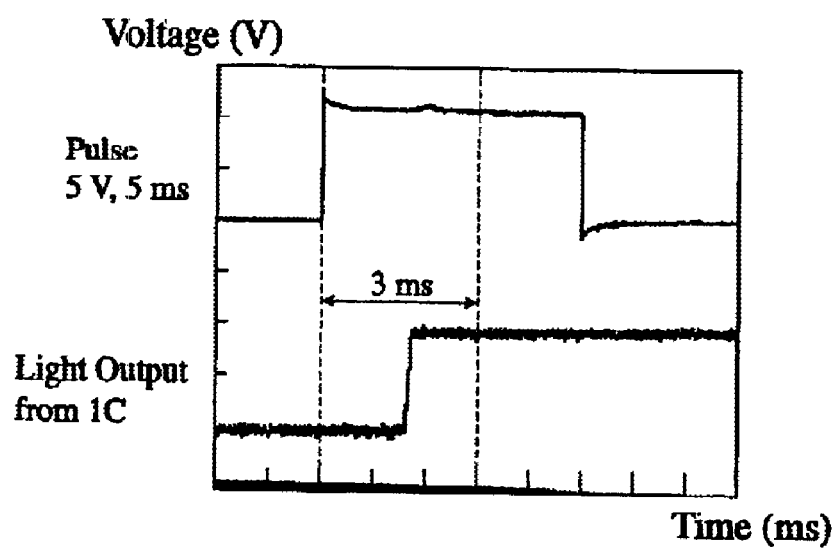
FIG. 14 is a graph showing the characteristics of switching to one output optical fiber in the optical switch of Example 3.
Figure 15:
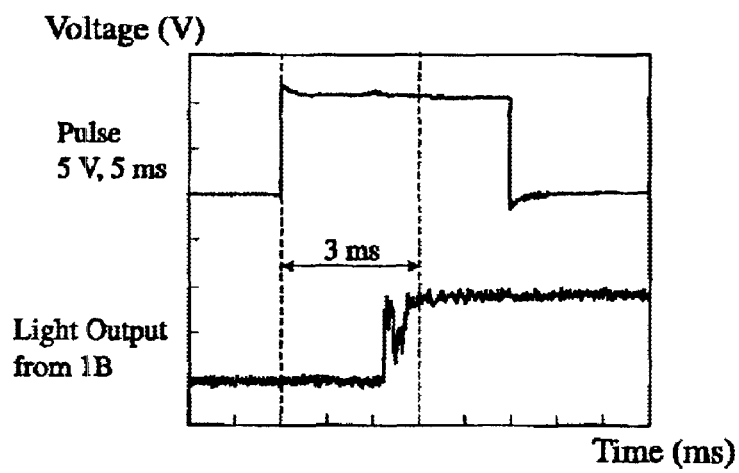
FIG. 15 is a graph showing the characteristics of switching to the other output optical fiber in the optical switch of Example 3.

FIGS. 14 and 15 show the measurement results of the switching characteristics of the optical switch of Example 3. FIG. 14 is a graph showing the relation between pulse voltage applied to the driving means 8 and light output from the output optical fiber 1C, in the case of the optical path 3a by the stationary reflection mirror 2B. FIG. 15 is a graph showing the relation between pulse voltage applied to the driving means 8 and light output from the output optical fiber 1B, in the case of the optical path 3b by the movable reflection mirror 2A. In both figures, the axis of abscissas represents time, an upper wave form represents the pulse voltage applied, and a lower wave form represents the intensity of light (light output) obtained from the output optical fiber. When pulse voltage is applied to magnetic coils 9A, 9B, namely when current is supplied to the magnetic coils 9A, 9B, a magnetic field is generated to move the bar 5 and the movable reflection mirror 2A.

It is clear from FIG. 14 that there is no initial variation in the switching to the output optical fiber 1C at all, resulting in stable switching operation. It is appreciated that when pulse voltage of 5 V and 5 ms is applied as a switching input, light output is obtained for the switching time of about 3 ms or less.

Figure 16:
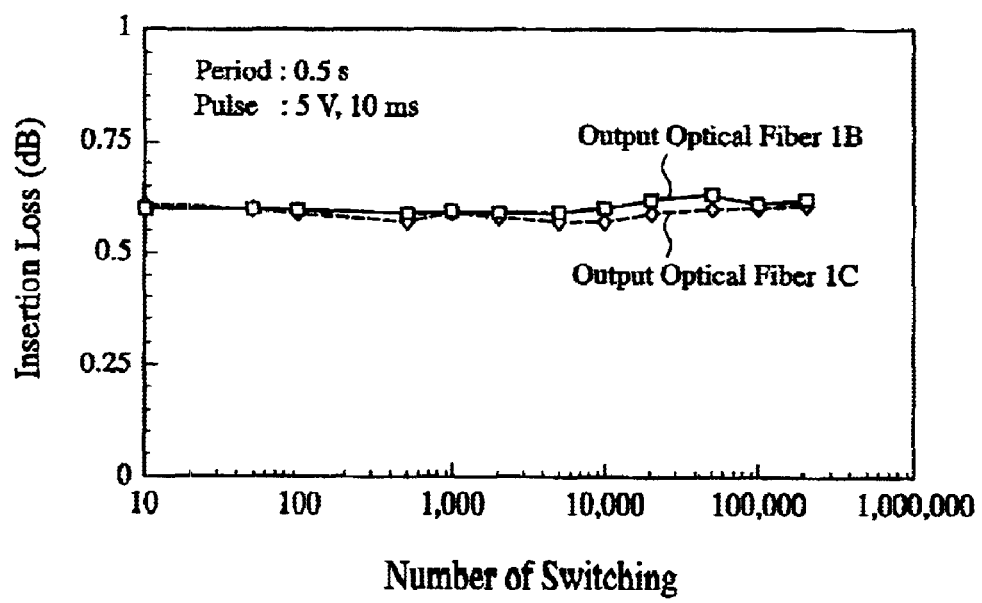
FIG. 16 is a graph showing the results of repeated switching tests in the optical switch of Example 3.

FIG. 16 shows the results of switching tests repeated every 0.5 seconds. In FIG. 16, the axis of abscissas represents the number of switching (indicated exponentially), and the axis of ordinates represents insertion loss (dB) in the output optical fibers. In both output optical fibers 1B and 1C, the variation of the insertion loss was 0.1 dB or less even with 200,000 or more of switching, proving the a stable operation was obtained.

The optical switch of Example 3 has as low insertion loss as 1 dB or less and as fast as 3 ms in switching time. It was confirmed from the result of a repetition test of 200,000 or more that this optical switch had as low insertion loss as 1 dB or less and thus high reproducibility.

EXAMPLE 4

With the optical paths of the optical switch of Example 3 reversed, it is possible to provide an optical switch for alternately measuring output signals of two light sources by one light-measuring apparatus. Using two light-emitting diodes as light sources, each emitted light is introduced into optical fibers 1B, 1C.

Light from the optical fiber 1B was reflected by the movable reflection mirror 2A, introduced into the optical fiber 1A, and then into the light-measuring apparatus connected to the other end of the optical fiber, to measure the intensity of light, from which the relation between the wavelength and intensity of light from the first light-emitting diode was determined. In this case, light from the optical fiber 1C was interrupted by a rear surface of the movable reflection mirror 2A. With driving current supplied to the optical switch to retreat the movable reflection mirror 2A, light from the optical fiber 1C was reflected by the stationary reflection mirror 2B and introduced into the optical fiber 1A and then into a light-measuring apparatus connected to the other end of the optical fiber, to measure the intensity of light, from which the relation between the wavelength and intensity of light from the second light-emitting diode was determined. In this case, light from the optical fiber 1B is reflected by the edge of the stationary reflection mirror, and thus not enters into the optical fiber 1A. In order that light not entering into the optical fiber 1A does not become stray light, it is preferable to coat parts not directly exposed to the optical path and the inner wall of the casing 10 with a black paint.

With current supplied to each light-emitting diode increased, and with optical paths switched by the same method, the light characteristics of two light-emitting diodes were successively measured by one light-measuring apparatus. Because measurement is carried out successively without interruption by the same measuring apparatus like this in Example 4, the light characteristics of two light-emitting diodes can be compared without influence by the precision of a measuring apparatus and the relation between the light-emitting diodes and room temperature.

EXAMPLE 5

Figure 17:
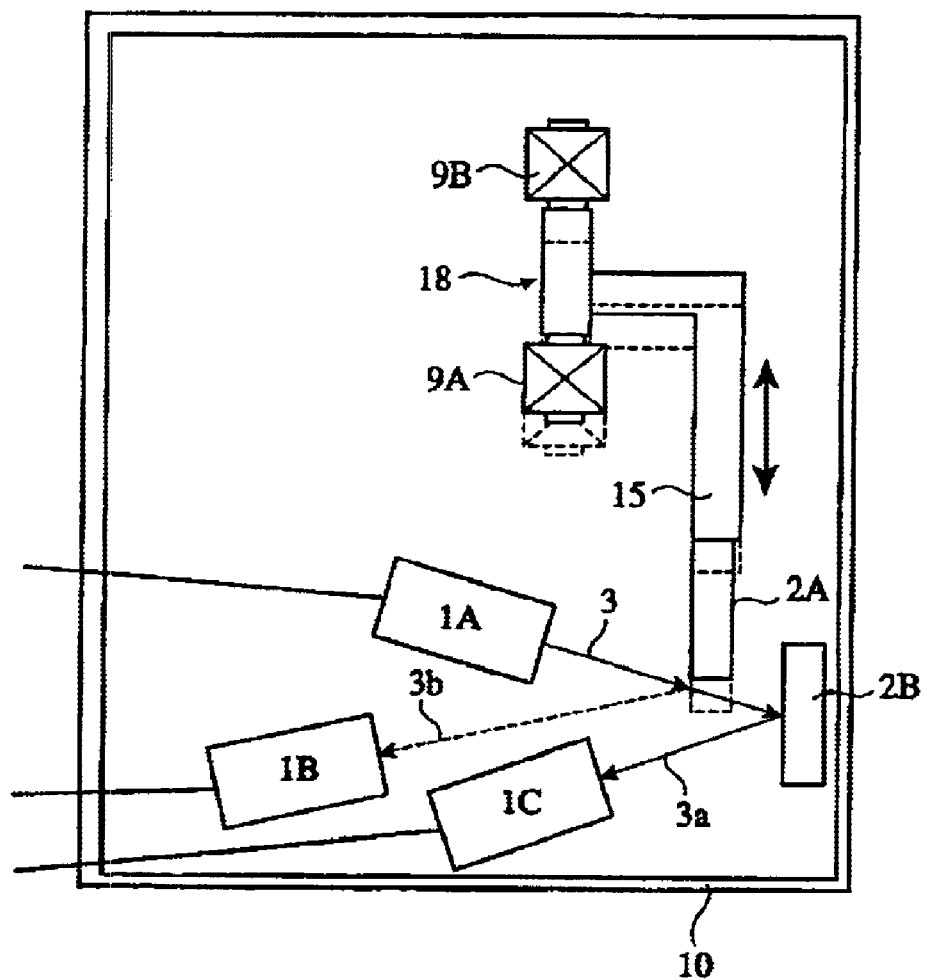
FIG. 17 is a plan view showing the specific structure of the 1×2-type optical switch of Example 5.

The seesaw-type driving means 8 shown in FIG. 13 was replaced by a parallel-movement-type driving means 18 shown in FIG. 17 to constitute the optical switch of Example 5. The parallel-movement-type driving means 18 is constituted by a pair of magnetic coils 9A, 9B capable of moving a plate bar 15 in parallel, and a reflection mirror 2A mounted onto a tip end of the bar 15. In a state where the bar 15 is retreated, a light beam in an optical path 3 is reflected by a stationary reflection mirror 2B and enters into an output optical fiber 1C along an optical path 3a. When the bar 15 projects to interrupt the optical path 3, a light beam from an input optical fiber 1A is reflected by a reflection mirror 2A and enters into an output optical fiber 1B along an optical path 3b. The optical switch of Example 5 has high reproducibility like that of Example 3, with as low insertion loss as 1 dB or less.

Though the reflection mirror is formed by plating an end surface of the bar 15, the reflection mirror may also be formed by attaching a light, thin mirror to the bar 15. However, because a plating layer less increases the weight of the bar 15, it provides faster switching of optical paths than when a thin mirror is used.

EXAMPLE 6

Figure 18:
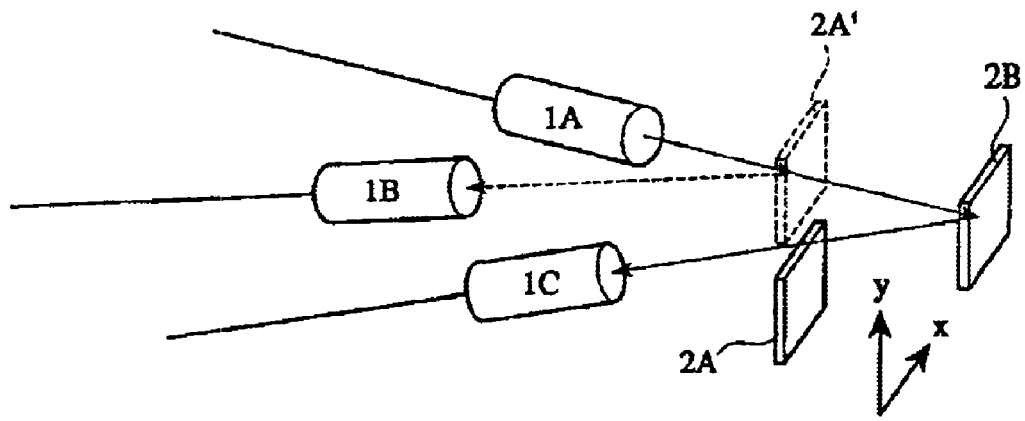
FIG. 18 is a perspective view showing the 1×2-type optical switch of Example 6.

FIG. 18 is a perspective view showing another example of the optical switch of the present invention. This optical switch is the same as the optical switch of Example 3 except that a movable reflection mirror 2A is movable in a Y direction.

EXAMPLE 7

Figure 19:
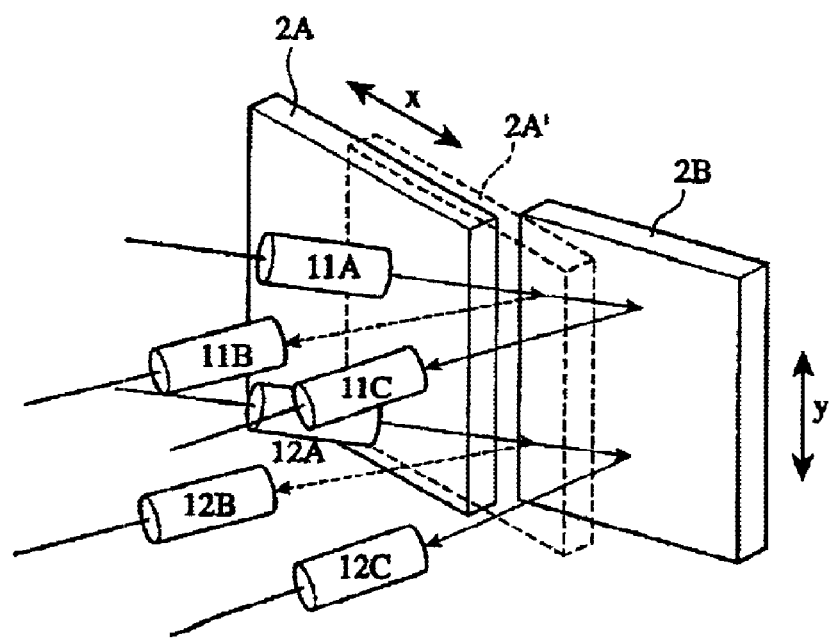
FIG. 19 is a perspective view showing the 2×4-type optical switch of Example 7.

FIG. 19 is a perspective view showing a further example of the optical switch of the present invention. This optical switch has similar structures of an optical fiber and a reflection mirror to those shown in FIG. 11. Specifically, this optical switch comprises a 1×2-type optical switch having a combination of an input optical fiber 1A and two output optical fibers 11B, 11C, and a 1×2-type optical switch having a combination of an input optical fiber 12A and two output optical fibers 12B, 12C, which are vertically arranged, and further comprises a set of a movable reflection mirror 2A and a stationary reflection mirror 2B as common reflection means. With the reflection mirrors shared, the number of parts and thus the number of assembling steps can be reduced.

The operation of this optical switch will be explained in detail. When the movable reflection mirror 2A is held at a position at which it does not interrupt the optical paths of the optical fibers 11A, 12A, light from the input optical fiber 11A is reflected by the stationary reflection mirror 2B and introduced into the output optical fiber 11C. Also, light from the input optical fiber 12A is reflected by the stationary reflection mirror 2B and introduced into the output optical fiber 12C. When the movable reflection mirror 2A is moved in an X direction to a position at which it crosses the optical paths of the input optical fibers 11A, 12A (the movable reflection mirror moved to a crossing position is shown by 2A'), light from the input optical fiber 11A is reflected by the movable reflection mirror 2A' and introduced into the output optical fiber 1B, while light from the input optical fiber 12A is reflected by the movable reflection mirror 2A' and introduced into the output optical fiber 12B. Thus, a set of the movable reflection mirror 2A and the stationary reflection mirror 2B provides a 2×4-type optical switch having a function of simultaneously switching the two 1×2-type optical switches.

As an example developed from Example 7, a 3×6-type optical switch can be produced by disposing 3 sets of 1×2 optical fibers to a set of a movable reflection mirror and a stationary reflection mirror in a Y direction. Further, with the movable reflection mirror and the stationary reflection mirror elongated in a Y direction, N 1×2 optical-path-switching mechanisms can be arranged to provide an N×2N-type optical switch.

EXAMPLE 8

Figure 20:
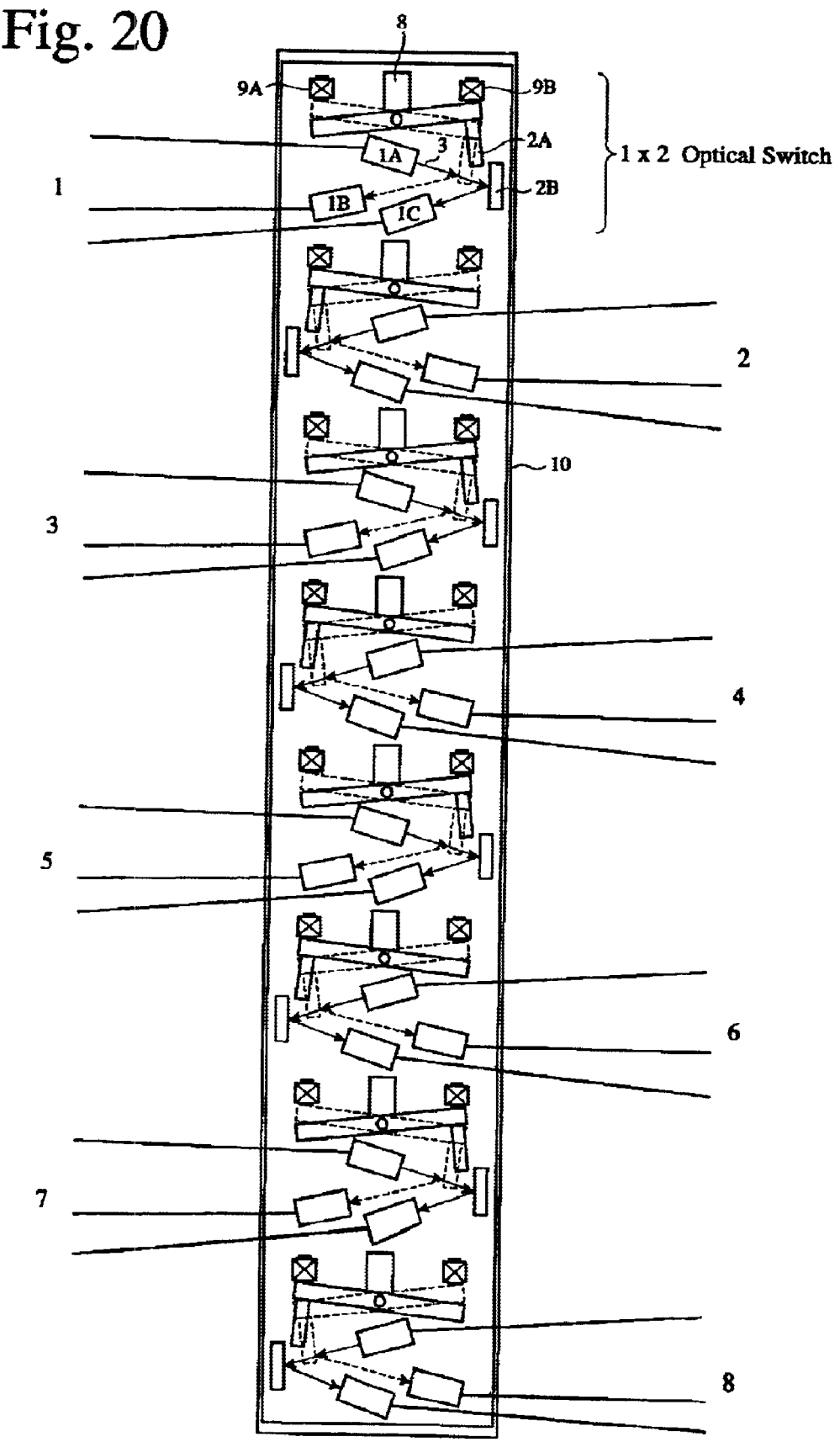
FIG. 20 is a plan view showing the 1N×2N-type optical switch of Example 8.

Though the optical switch of Example 7 has a structure in which two 1×2 switches are simultaneously switched, the arrangement of N 1×2-type optical switches of Example 3 can provide a 1N×2N-type optical switch as shown in FIG. 20. The illustrated example is an 8×16-type optical switch having 8 input terminals and 16 output terminals, which can be obtained by disposing 8 optical switches of Example 3 in a casing 10 made of SUS in parallel, and extending each optical fiber outside the casing. This optical switch may be called a 8-stage, mirror-driven, 1×2-type optical switch. Its input terminal and output terminal are optical fiber connectors arranged at the ends of the optical fibers. Unlike the optical switch of Example 7, a control means for separately operating driving means would be able to arbitrarily switch each optical path of this optical switch. By changing the number of 1×2-type optical switches arranged in parallel, it is also possible to provide a 4×8-type optical switch and a 12×24-type optical switch.

EXAMPLE 9

Figure 21:
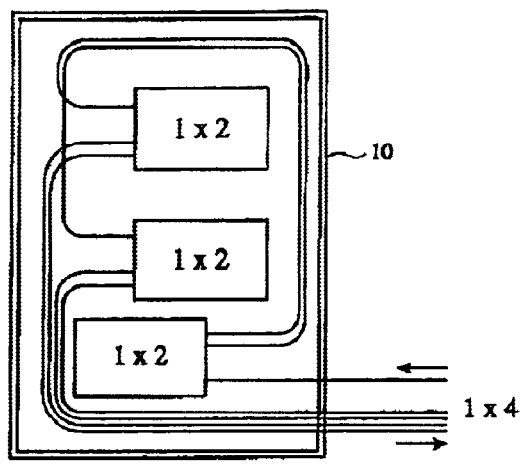
FIG. 21 is a plan view showing the 1×4 optical switch of Example 9.

As shown in FIG. 21, a 1×4-type optical switch can be obtained by connecting three mirror-driven, 1×2-type optical switches of Example 3 in a multi-stage manner. Two output optical fibers of the first 1×2-type optical switch are connected to the input optical fibers of the second and third 1×2-type optical switches, respectively, via optical fiber connectors. Incidentally, instead of connecting via a connector, the optical fibers may be directly fused to each other. With 3 connected optical switches received in a casing 10, the input optical fiber of the first 1×2-type optical switch serving as one input terminal, and the output optical fibers of the second and third 1×2-type optical switches serving as four output terminals, a mirror-driven, 1×4-type optical switch can be obtained.

Further, Example 9 can be developed by the same multi-stage connection method to constitute a mirror-driven, 1×8-type optical switch, a mirror-driven, 1×16-type optical switch, a mirror-driven, 1×32-type optical switch, etc.

In the construction of an N×M-type optical switch, a tree-type multi-stage connection is not necessarily symmetric laterally like in Example 9, but at least one output terminal of M may be branched at a stage before the last stage depending on the necessary values of N and M. With this structure, a 1×3-type optical switch, a 1×7-type optical switch, a 1×9-type optical switch, a 1×10-type optical switch, a 1×12-type optical switch, etc., each driven by mirrors, may be obtained.

EXAMPLE 10

Figure 22:
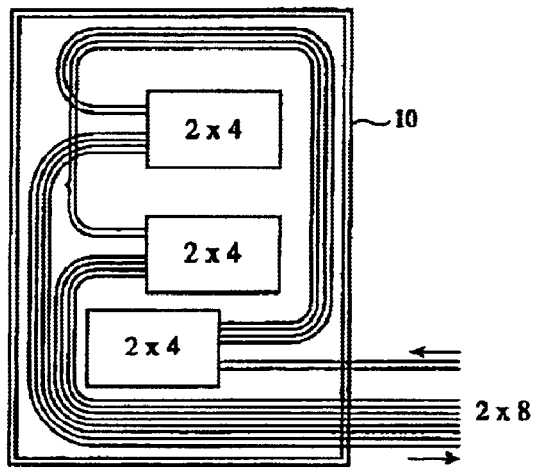
FIG. 22 is a plan view showing the 2×8 optical switch of Example 10.

As shown in FIG. 22, the connection of three mirror-driven, 2×4-type optical switches of Example 7 in a multi-stage manner according to Example 9 can provide a 2×8-type optical switch. Two output terminals corresponding to one input terminal of the first 2×4-type optical switch are connected to two input terminals of the second 2×4-type optical switch, and two output terminals corresponding to the other input terminal of the first 2×4-type optical switch are connected to two input terminals of the third 2×4-type optical switch.

As a modification of Example 10, a 1×2-type optical switch may be connected to N-stage, N×2N-type optical switches (N is an integer of 2 or more) in a multi-stage manner to constitute a 1×2N-type optical switch.

EXAMPLE 11

Figure 23:
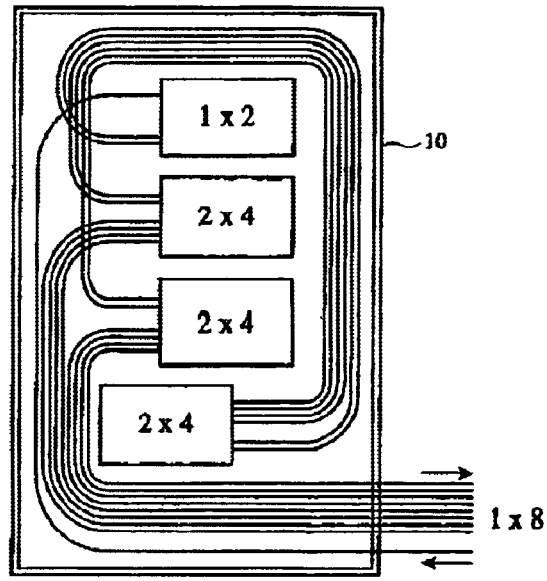
FIG. 23 is a plan view showing the 1×8-type optical switch of Example 11.

As shown in FIG. 23, the output terminals of a mirror-driven, 1×2-type optical switch may be connected to the input terminals of the 2×8-type optical switch of Example 10 to constitute a 1×8-type optical switch.

EXAMPLE 12

Figure 24:
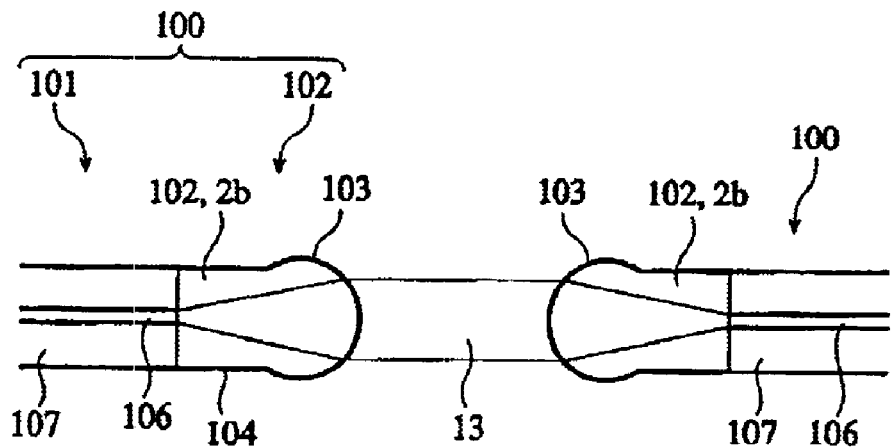
FIG. 24 is a cross-sectional view showing an example of the spherical-tip optical fiber collimators of Example 12.
Figure 25:
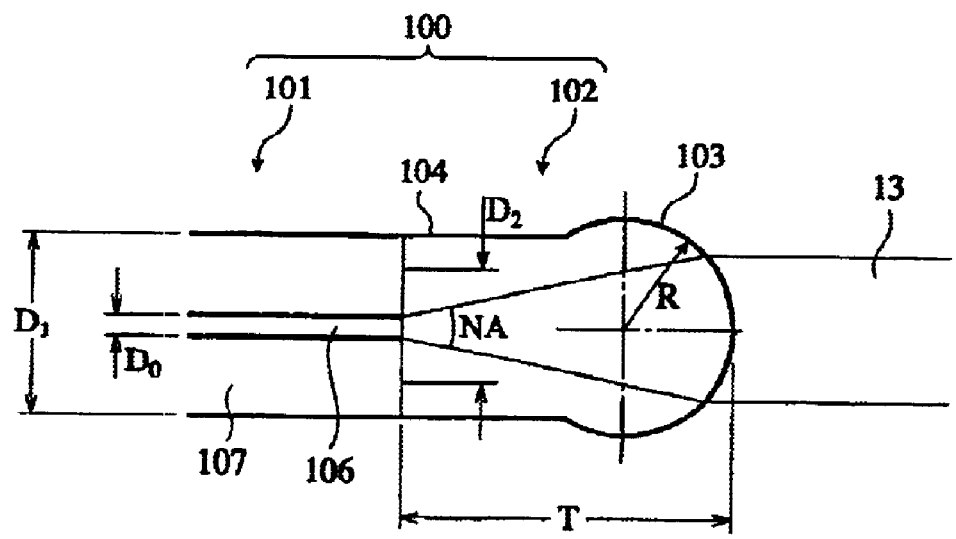
FIG. 25 is a cross-sectional view showing the detailed structure of the spherical-tip optical fiber of FIG. 24.

FIG. 24 is a cross-sectional view showing an example of spherical-tip optical fiber collimators usable in the present invention, and FIG. 25 is a cross-sectional view showing the detailed structure of each spherical-tip optical fiber 100. The spherical-tip optical fiber 100 comprises a body portion 101 constituted by a core 106 for transmitting light and a clad layer 107 covering the core 106, and a collimator portion 102 comprising a spherical tip portion 103. The spherical tip portion 103 of the collimator portion 102 is formed by fusing an optical fiber 104 having a larger core diameter $D_2$ than the core diameter $D_0$ of the body portion 101 to an end surface of the optical fiber body portion 101, and rounding a tip portion of the optical fiber 104 by thermal melting.

With two spherical-tip optical fibers 100, 100 arranged such that the collimator portions 102, 102 are opposing each other, a light beam 13 is sent therebetween. Light transmitting through the spherical tip portion 103 from the core 106 emits from the spherical-tip optical fiber 100 as a light beam 13. The light beam 13 is a collimated parallel light beam, namely a collimated light.

Referring to FIG. 25, in order that light 13 exiting from the spherical tip portion 103 of the spherical-tip optical fiber 100 is a collimated light, the radius R of curvature of the spherical tip portion 103, the distance T between a tip end of the spherical tip portion 103 and an end of the core 106 of the optical fiber 100, and an expanding angle (NA) of a light beam exiting from the core 106 should meet the condition represented by the following formula (1):

$$\sin^{-1}\left(\frac{n_1}{n_0} \cdot \frac{T-R}{R} \cdot NA\right) = \sin^{-1}(NA) + \sin^{-1}\left(\frac{T-R}{R} \cdot NA\right) \quad (1)$$

wherein $N_0$ is a refractive index of air, and $N_1$ is a refractive index of the optical fiber 104.

Second, it is necessary to meet the condition that a light beam exiting from the core 106 of the optical fiber 100 does not reach the outer surface of the core of the optical fiber 104 or the outer surface of the optical fiber 104. This condition is represented by the following formula (2):

$$T \le \sqrt{R^2 - \left(\frac{D_1}{2}\right)^2} + R + \frac{D_1}{2 \cdot \tan(\sin^{-1} NA)} \quad (2)$$

Third, if the light beam 13 has too large an expanding angle NA, it fails to satisfy the formula (1). Accordingly, it should satisfy the following formula (3):

$$NA \le \frac{n_0}{n_1} \frac{R}{T-R} \quad (3)$$

In order that the core 106 of the optical fiber 100 does not remain in the spherical tip portion 103 formed by thermal melting, it is necessary to meet the condition represented by the following formula (4):

$$T \ge 2R \quad (4)$$

Figure 26:
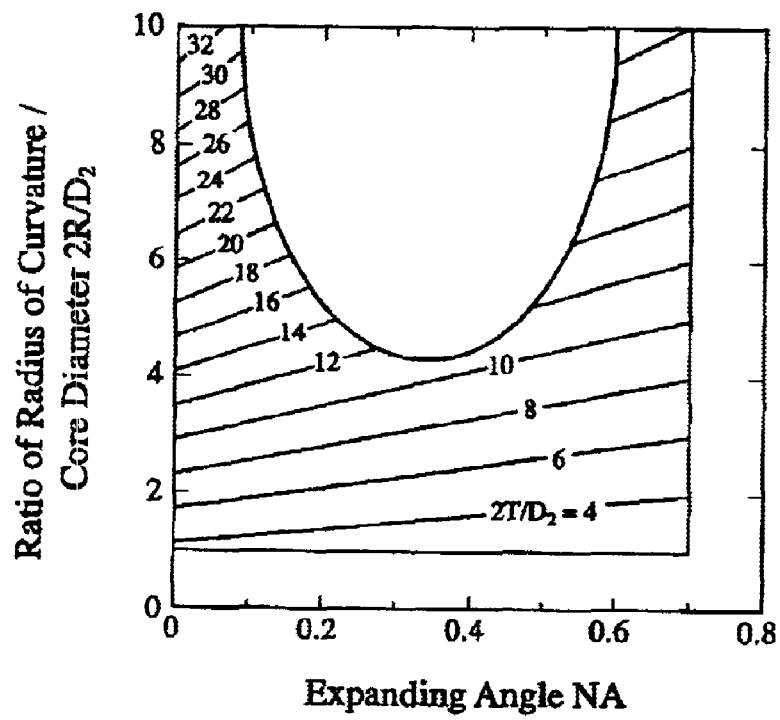
FIG. 26 is a graph showing the conditions of the spherical-tip optical fiber of the present invention.

FIG. 26 shows the calculation results of the shape of the spherical tip portion 103 satisfying the formulae. (1)–(4). Calculation was conducted relative to the expanding angle NA of a light beam, using the radius R of curvature of the spherical tip portion and the distance T from the core to the tip portion as parameters. In the graph, the axis of abscissas represents NA, and the axis of ordinates represents a ratio of radius of curvature/core diameter ($2R/D_2$). R and T are normalized by the core diameter $D_2$ of the optical fiber 104. To obtain the spherical-tip optical fiber collimator of the present invention, the spherical tip portion 103 is formed preferably such that $2R/D_2$ is 1 or more, that NA is 0.01–0.7, that $2T/D_2$ is 1.985–32, and that relations represented by slanting lines in a concave-lens-shaped region except for a white center upper region in the graph of FIG. 26 are satisfied. Each slanting line shows calculation results in a range of $2T/D_2$=4–32.

Figure 27:
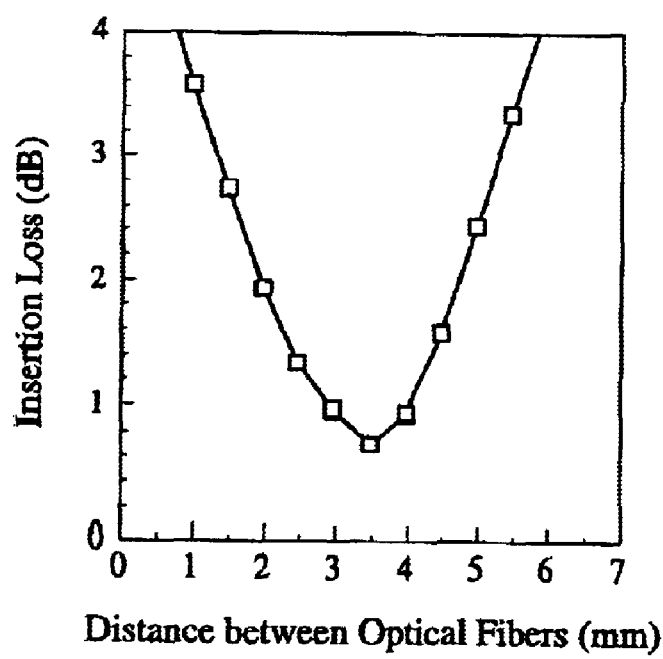
FIG. 27 is a graph showing the relation between the distance between the spherical-tip optical fibers of Example 12 and insertion loss.
Figure 28:
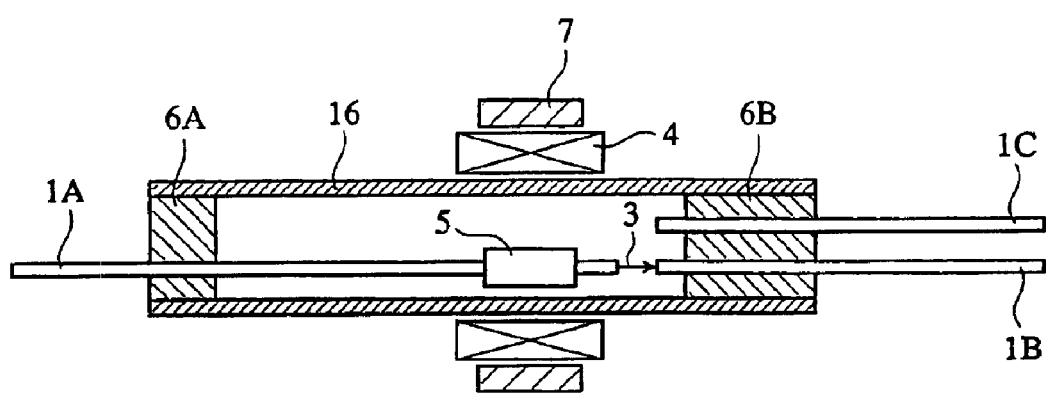
FIG. 28 is a cross-sectional view showing an example of conventional optical switches.
Figure 29:
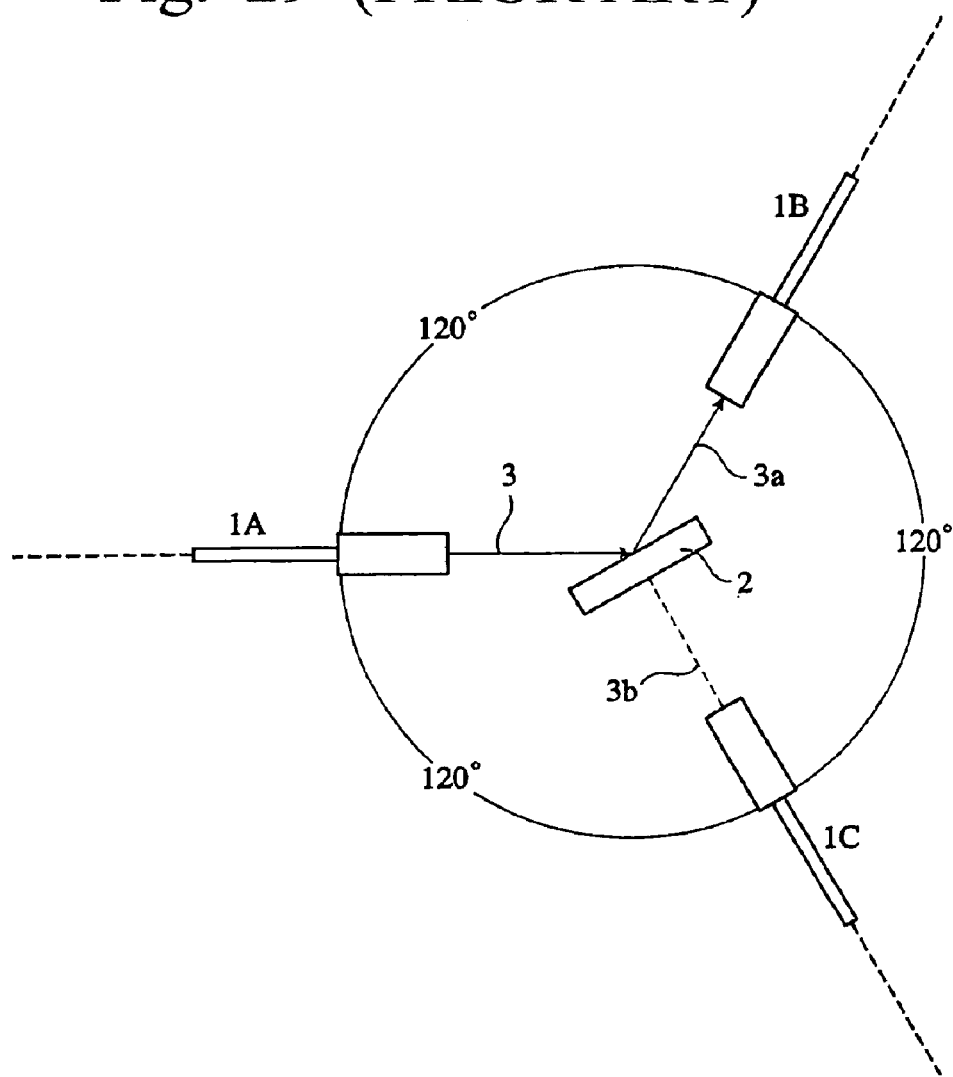
FIG. 29 is a cross-sectional view showing another example of conventional optical switches.
Figure 30:
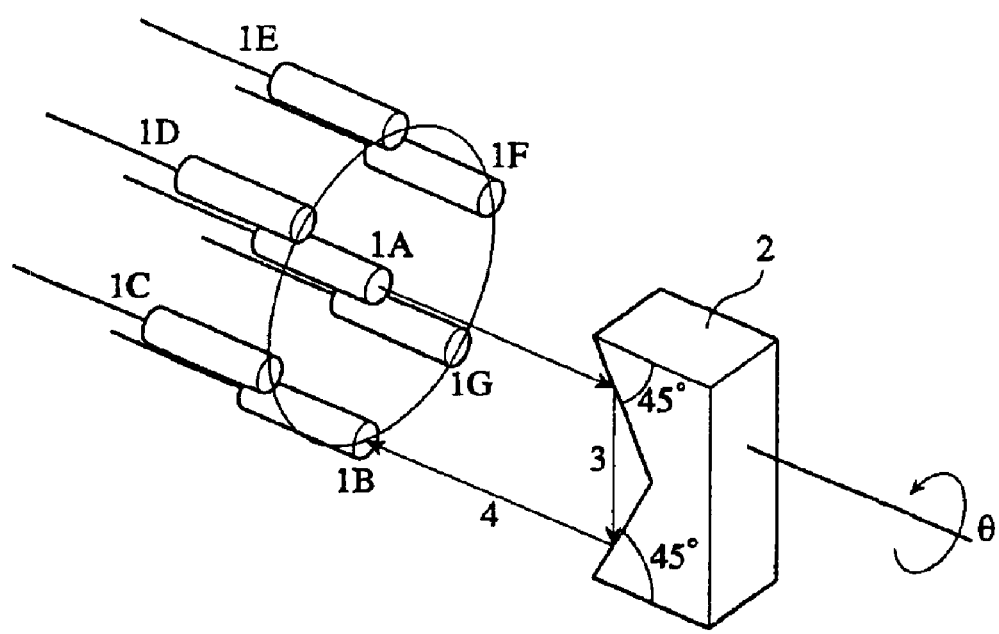
FIG. 30 is a cross-sectional view showing a further example of conventional optical switches.
Figure 31:
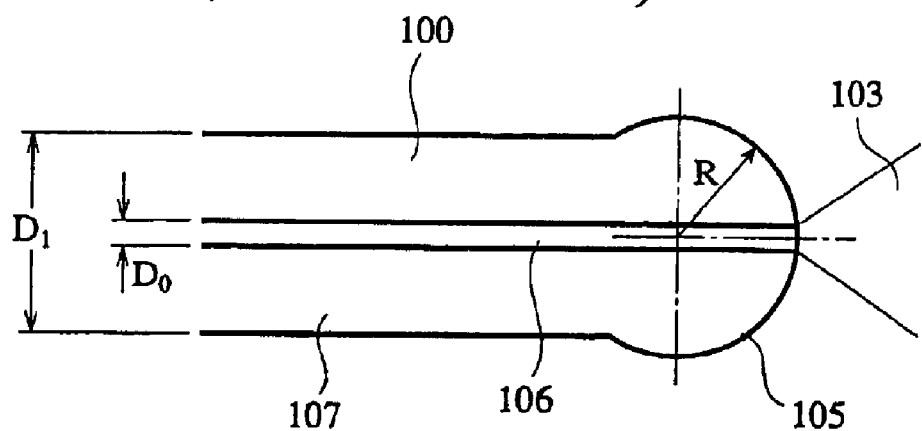
FIG. 31 is a cross-sectional view showing an example of conventional spherical-tip optical fibers.
Figure 32:
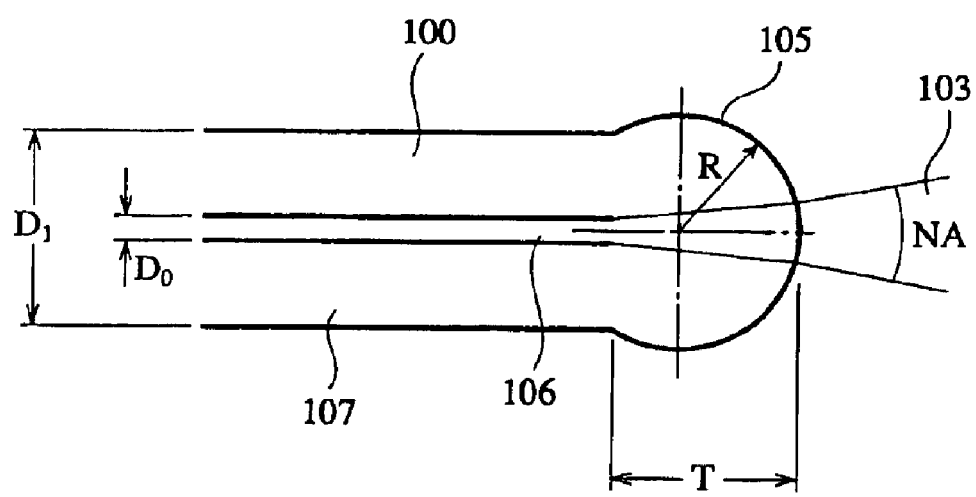
FIG. 32 is a cross-sectional view showing another example of conventional spherical-tip optical fibers.

An optical fiber 104 having an outer diameter $D_1$ of 125 µm and a core diameter $D_2$ of 100 µm was fused to a single-mode optical fiber body portion 101 having an outer diameter $D_1$ of 125 µm and a core diameter $D_0$ of 10 µm, and its tip portion was melted by heating to form a spherical tip portion 103 having a radius R of curvature of 200 µm. The length T of the collimator 102 was 800 µm. With the distance (mm) between two spherical-tip optical fibers 100, 100 thus obtained changed, its insertion loss (dB) was measured. The results are shown in FIG. 27. When the distance between the optical fibers 100, 100 is 3.5 mm, the insertion loss was 0.7 dB with such low reflection that the reflection return of light from the spherical tip portion 103 was 55 dB or more. The insertion loss is represented by IL=–10 $\log_{10}$ ($P_1/P_0$), wherein $P_0$ is power obtained by connecting a light source to a sensor via an optical fiber, and $P_1$ is power obtained by connecting the opposing sphere-tipped fiber collimators 100, 100 to a light source and a sensor, respectively. By coating the spherical tip portion 103 with a reflection-preventing layer, the insertion loss and the reflection return can further be reduced. If Example 12 is changed such that the outer diameter of the collimator 102 is larger than that of the optical fiber body 101, the precision of a spherical shape and a production yield can preferably be improved at the time of heat-melting the tip end portion.

EXAMPLE 13

A spherical-tip optical fiber was produced in the same manner as in Example 12 except for replacing the optical fiber 104 with an optical fiber composed only of a core. Because of no clad layer, $D_1=D_2$. This spherical-tip optical fiber collimator was formed by fusing an optical fiber 104b having a larger outer diameter than that of a body portion 101 to an end surface of an optical fiber body portion 101 comprising a light-transmitting core 106, and rounding a tip portion of the optical fiber 104b by thermal melting. Even this structure can achieve high coupling of optical fibers close to the coupling of Example 12. Incidentally, because there is slight scattering in a joint interface between the core 106 and the optical fiber 104, light from the core 106 may reach an outer surface of the optical fiber 104. To prevent this, as shown in FIG. 25, it is desirable that the optical fiber 104 is provided with a clad layer.

From the above results, to obtain a collimated parallel light beam stably, $D_2/D_1$ is preferably more than 10 Do, more preferably within a range of 0.8–3. $2R/D_2$ is preferably within a range of 1–10, more preferably within a range of 2–8. $T/D_2$ is preferably within a range of 4–30, more preferably within a range of 5–20.

As described above in detail, the present invention provides a small, low-loss optical switch with high precision of positioning and high reproducibility.

In addition, because the spherical-tip optical fiber of the present invention can achieve high coupling with low reflection, a combination of this spherical-tip optical fibers with conventional optical fibers and lenses can provide miniaturized optical devices.

What is claimed is:

1. An optical switch comprising one input optical fiber, two output optical fibers, a reflection mirror for switching an optical path of a light beam from said input optical fiber from one output optical fiber to the other output optical fiber, the distance between said input optical fiber and said reflection mirror being different from that between each of said output optical fibers and said reflection mirror, wherein a light beam incident on said reflection mirror from said input optical fiber is at an angle of 10° or less to a normal of said reflection mirror.

2. The optical switch according to claim 1, wherein the rotation angle of said reflection mirror is 20° or less, and an angle of each output optical fiber to said reflection mirror is two times the rotation angle of said reflection mirror.

3. The optical switch according to claim 1, comprising N sets of inputs and outputs each comprising one input optical fiber and two output optical fibers, and one reflection mirror for carrying out the switching of said N sets of inputs and outputs.

4. The optical switch according to claim 1, wherein said one input optical fiber is used as an output optical fiber, and said two output optical fibers are used as input optical fibers.

5. An optical switch comprising one input optical fiber, two output optical fibers, a first mirror for reflecting a light beam from said input optical fiber to cause it to enter into one output optical fiber, a second mirror moving into and out of an optical path of a light beam from said input optical fiber, and a means for driving said second mirror; whereby when said driving means drives said second mirror to a position at which it interrupts said optical path, a light beam from said input optical fiber is reflected by said second mirror so that it enters into the other output optical fiber, wherein an incident angle $\alpha_1$ of a light beam from said input optical fiber to said first mirror is different from an incident angle $\alpha_2$ of a light beam from said input optical fiber to said second mirror, and the difference between $\alpha_1$ and $\alpha_2$ is 0.5° or more.

6. The optical switch according to claim 5, wherein said first mirror is a stationary mirror, and said second mirror is a movable mirror.

7. The optical switch according to claim 5, wherein a light beam comes from one of said first and second output optical fibers, reflected by one of said first and second mirrors, and enters into said input optical fiber, whereby the input and output directions of said light beam are reversed.

8. The optical switch according to claim 5, wherein any of the incident angles of said light beam to said first and second mirrors is 20° or less.

9. The optical switch according to claim 5, wherein a plurality of said optical switches are connected in a multi-stage manner to constitute an N×M optical switch.

10. An N×2N-type optical switch comprising optical switches according to claim 5 for switching N optical paths.

11. The optical switch according to claim 1, wherein any of said input optical fiber and said output optical fiber is constituted by an optical fiber body portion comprising a core for transmitting light and a tip optical fiber portion integrally fused to a tip end of said optical fiber body portion, said tip optical fiber portion having a core having a larger diameter than that of the core of said optical fiber body portion or being composed only of a core, and said tip optical fiber portion having a spherical tip portion.

12. The optical switch according to claim 11, wherein the outer diameter of said tip optical fiber portion is equal to or larger than the outer diameter of said optical fiber body portion.

13. The optical switch according to claim 11, wherein the radius of curvature of said spherical tip portion of said tip optical fiber portion is half or more of the outer diameter of said tip optical fiber portion.

14. The optical switch according to claim 1, wherein any of said input optical fiber and said output optical fiber is constituted by an optical fiber body portion comprising a core for transmitting light and a tip optical fiber portion integrally connected to said optical fiber body portion, said tip optical fiber portion having a spherical tip portion, and the radius R of curvature of said spherical tip portion and the outer diameter $D_1$ of said optical fiber body portion meet the relation of $R > D_1/2$.

15. The optical switch according to claim 11, wherein the reflection return of light from said spherical tip portion is 55 dB or more.

16. An optical path-switching apparatus comprising the optical switches according to claim 1.

17. An optical path-switching apparatus comprising the optical switches according to claim 5.

18. An optical path-switching apparatus comprising the optical switches according to claim 10.

19. A method for producing an optical switch recited in claim 11, comprising the steps of integrally connecting a tip end of an optical fiber body portion comprising a core for transmitting light to a tip optical fiber portion having a core whose diameter is larger than that of said optical fiber body portion, and turning a tip portion of said tip optical fiber portion spherical.

* * * * *